United States Patent
Otsuka

(10) Patent No.: US 9,686,432 B2
(45) Date of Patent: Jun. 20, 2017

(54) FACSIMILE APPARATUS, OPTIONAL UNIT, AND CONTROL SYSTEM OF OPTIONAL UNITS

(71) Applicant: SEIKO EPSON CORPORATION, Tokyo (JP)

(72) Inventor: Tadashi Otsuka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/617,773

(22) Filed: Feb. 9, 2015

(65) Prior Publication Data
US 2015/0229798 A1 Aug. 13, 2015

(30) Foreign Application Priority Data

Feb. 10, 2014 (JP) ................................. 2014-023833
Mar. 28, 2014 (JP) ................................. 2014-069759
Mar. 28, 2014 (JP) ................................. 2014-069760

(51) Int. Cl.
*H04N 1/00* (2006.01)

(52) U.S. Cl.
CPC ....... *H04N 1/00904* (2013.01); *H04N 1/0057* (2013.01); *H04N 1/00623* (2013.01); *H04N 1/00888* (2013.01); *H04N 2201/0093* (2013.01); *H04N 2201/0094* (2013.01)

(58) Field of Classification Search
CPC .. H04N 1/00904; H04N 1/00888; H02J 11/00
USPC ......... 358/1.13, 1.14, 1.15, 446; 399/13, 37, 399/88; 700/22, 295, 297
See application file for complete search history.

(56) References Cited

U.S. PATENT DOCUMENTS

| 6,934,141 | B2* | 8/2005 | Hamano | H02H 9/001 361/160 |
| 7,634,079 | B2 | 12/2009 | Yamashita et al. | |
| 2008/0250261 | A1* | 10/2008 | Nguyen | G06F 11/30 713/340 |

FOREIGN PATENT DOCUMENTS

| JP | 2002-255382 | 9/2002 |
| JP | 2003-324843 | 11/2003 |
| JP | 2006-19986 | 1/2006 |
| JP | 2012-143114 | 7/2012 |

* cited by examiner

*Primary Examiner* — Jamares Q Washington
(74) *Attorney, Agent, or Firm* — Workman Nydegger

(57) ABSTRACT

Provided is an optional unit configured to be connected, in series, to a power supply apparatus for supplying drive electricity, the optional unit including: a receiving unit which receives the electricity supplied from the power supply apparatus or an optional unit in a higher connection level; a supply unit which supplies the electricity to a receiving unit of an optional unit in a lower connection level; and an operation unit which operates based on the electricity received by the receiving unit. In accordance with a voltage of the supplied electricity, based on which the operation unit of the optional unit in the higher level operates, exceeding a predetermined threshold value, the operation unit of the optional unit in the lower level below the optional unit in the higher level starts to receive the supplied electricity.

14 Claims, 12 Drawing Sheets

FACSIMILE APPARATUS, OPTIONAL UNIT, AND CONTROL SYSTEM OF OPTIONAL UNITS

BACKGROUND

1. Technical Field

The present invention relates to a facsimile apparatus, an optional unit, and a control system of optional units.

2. Related Art

A configuration of a main body of a multifunctional machine or the like provided with a facsimile function, a copy function, and a print function, for example, to which a user can arbitrarily add sheet supply cassettes (sheet supply units) as optional units, is known. To such sheet supply units, a drive voltage is supplied from the side of the main body. However, if an inrush current is generated in the respective optional units at the same timing as when power supply is started, a value of a current output from the side of the main body temporarily becomes excessively large due to a total inrush current, and a large burden is applied to the side of the main body.

A configuration in which switches and timing generation circuits with different time constants are provided in an IP telephone terminal and the respective optional units and timings at which drive power is supplied to load circuits in the respective units are differentiated between the IP telephone terminal and the respective optional units when power supply is started is disclosed (see JP-A-2006-19986).

In order to differentiate the timings at which the drive power is supplied to the load circuits in the respective units as disclosed in JP-A-2006-19986, it is necessary to provide timing generation circuits with different time constants in the respective optional units. For this reason, it is not possible to respond to a requirement for mass producing optional units of the same specification to an extent necessary for enhancing production efficiency.

Although a configuration is also considered in which variable resistors are provided in the timing generation circuits to allow a user to set different time constants for the respective optional units, it is necessary for the user to perform complicated operations, and there is also a possibility that erroneous setting may be performed.

SUMMARY

An advantage of some aspects of the invention is to provide a facsimile apparatus, an optional unit, and a control system of optional units in which the adverse effect of the inrush current is suppressed.

According to an aspect of the invention, there is provided a facsimile apparatus including: a main body portion which includes a scanner unit configured to read an original document, a facsimile unit capable of faxing image data, which is generated by the reading, to the outside and receiving image data faxed from the outside, and a print unit configured to print an image based on the received image data on a supplied sheet; and a sheet supply unit which supplies the sheet. The sheet supply unit includes one or more voltage receiving units which are provided from a higher level located near the print unit and receive a drive voltage supplied from the main body portion or another sheet supply unit in a higher level, a voltage supply unit which supplies a voltage to a voltage receiving unit in another sheet supply unit in a lower level, a motor which is driven by the voltage supplied to the voltage receiving unit, a notification input unit to which a notification signal is input from the main body portion or the sheet supply unit in the higher level, a notification output unit which outputs the voltage, which is supplied from the voltage receiving unit to the motor, as the notification signal to the notification input unit of the sheet supply unit in the lower level, and a control unit which starts the supply of the voltage from the voltage receiving unit to the motor in accordance with the voltage of the notification signal, which is input by the notification input unit, exceeding a predetermined threshold value. A stored sheet or a sheet supplied from a sheet supply unit in the lower level is supplied to the sheet supply unit in the higher level or the print unit with power caused by the motor.

According to the aspect of the invention, the drive voltage is supplied from the sheet supply unit in the highest level to the sheet supply unit in the lowest level via the voltage receiving unit and the voltage supply unit in each sheet supply unit. In contrast, the control unit starts the supply of the voltage from the voltage receiving unit to the motor in accordance with the voltage of the notification signal, which is input by the notification input unit in the higher level, exceeding the predetermined threshold value, and the voltage supplied from the voltage receiving unit to the motor is also output as the notification signal for the sheet supply unit in the lower level. For this reason, a timing at which the supply of the voltage from the voltage receiving unit to the side of the motor starts deviates for each sheet supply unit, and inrush current generation timings of each sheet supply unit do not overlap. According to the aspect of the invention, an effect of the inrush current generation timing deviating for each sheet supply unit can be achieved merely by mounting a plurality of sheet supply units with the same configuration on the facsimile apparatus. Accordingly, the problem which is assumed to occur in the related art disclosed in JP-A-2006-19986 does not occur, and it is not particularly necessary to take measures for handling an increase in inrush current (measures which bring about an increase in cost and an increase in size) on the main body side of the facsimile apparatus.

In this case, the control unit may include a switch interposed between the voltage receiving unit and the motor and a switch control circuit which shifts the switch from a non-conductive state to a conductive state in accordance with the voltage of the notification signal, which is input by the notification input unit, exceeding the threshold value.

With such a configuration, a timing at which the switch allows conduction deviates for each sheet supply unit, and therefore, overlapping of the inrush current generation timings of each sheet supply unit is avoided.

In this case, the control unit may include a capacitor with one end connected between the switch and the motor and the other end connected to a ground, the switch may be a MOSFET, and the switch control circuit may include a Zener diode with a cathode connected to the side of the notification input unit and a first bipolar transistor with a base connected to a side of an anode of the Zener diode, a collector connected to a gate of the MOSFET, and an emitter connected to a ground. Breakdown of the Zener diode may occur in accordance with an increase in voltage of the notification signal which is input by the notification input unit, the first bipolar transistor may be shifted from the non-conductive state to the conductive state after the breakdown, and electrical charge may be accumulated in the capacitor by a current which passes between a source and a drain of the MOSFET from the voltage receiving unit and is input to the side of the motor in accordance with the MOSFET being shifted from the non-conductive state to the conductive state after the first bipolar transistor conducts.

With such a configuration, the current (inrush current) which passes through the MOSFET from the voltage receiving unit and is input to the side of the motor disappears from each sheet supply unit when charging of the capacitor is completed, and such an inrush current is generated at different timings in each sheet supply unit.

In this case, in the control unit, resistors may be provided in all routes between the voltage receiving unit and the switch.

With such a configuration, the resistors are provided on all the routes through which the current can flow to a parasitic capacitance that is present between the voltage receiving unit and the switch, and therefore, it is possible to suppress flow of a kind of inrush current called a spike wave or the like to the parasitic capacitance.

In this case, in the control unit, the switch may be a MOSFET, a first resistor may be provided between the voltage receiving unit and a source of the MOSFET, a second bipolar transistor with an emitter connected to a first connection point between the voltage receiving unit and the first resistor, a base connected to a second connection point between the first resistor and the source of the MOSFET, and a collector connected to a gate of the MOSFET may be provided, a second resistor may be provided between the base of the second bipolar transistor and the second connection point, and a third resistor may be provided between the collector of the second bipolar transistor and the gate of the MOSFET.

With such a configuration, it is possible to accurately restrict the current which passes through the MOSFET and to suppress the inrush current which can be generated due to the presence of the parasitic capacitance.

The technical idea of the invention is not implemented only as the aforementioned facsimile apparatus and may be widely implemented as an optional unit connected, in series, to a power supply apparatus (the main body portion, for example) for supplying a drive voltage, a system including the optional unit, and the like.

As an example, an optional unit configured to be connected, in series, to a power supply apparatus for supplying drive voltage can be understood as an aspect of the invention. According to the aspect, there is provided an optional unit including: a voltage receiving unit which receives the voltage supplied from the power supply apparatus or an optional unit in a higher connection level; a voltage supply unit which supplies a voltage to a voltage receiving unit of an optional unit in a lower connection level; an operation unit which operates based on the voltage received by the receiving unit; a notification input unit which inputs a notification signal from the power supply apparatus or the optional unit in the higher level; a notification output unit which outputs the voltage, which is supplied from the receiving unit to the operation unit, as the notification signal to the notification input unit in the optional unit in the lower level; and a control unit which starts the supply of the voltage from the voltage receiving unit to the operation unit in accordance with the voltage of the notification signal, which is input by the notification input unit, exceeding a predetermined threshold value.

A control system of optional units, which is provided with a power supply apparatus for supplying a drive voltage and optional units connected to the power supply apparatus in series, can be understood as an aspect of the invention. According to the aspect, there is provided a control system in which the power supply apparatus includes a first voltage supply unit configured to supply a voltage to an optional unit in the highest connection level and a first notification output unit configured to output a notification signal to the optional unit in the highest level, in which each of the optional units includes a voltage receiving unit configured to receive the voltage supplied from the power supply apparatus or an optional unit in a higher level, a second voltage supply unit configured to supply the voltage to a voltage receiving unit of an optional unit in a lower level, an operation unit configured to operate based on the voltage received by the voltage receiving unit, a notification input unit configured to input a notification signal from the power supply apparatus or the operation unit in the higher level, a second notification output unit configured to output the voltage, which is supplied from the voltage receiving unit to the operation unit, as the notification signal to the notification input unit in the optional unit in the lower level, and a control unit configured to start the supply of the voltage from the voltage receiving unit to the operation unit in accordance with a voltage of the notification signal, which is input by the notification input unit, exceeding a predetermined threshold value.

The system may be present in a single independent product or may be present across a plurality of products. In addition, the invention may be implemented as an invention of the respective methods including processing processes corresponding to the facsimile apparatus, the optional unit, the power supply apparatus (the main body portion, for example), and the system, or in various categories including a computer program which causes hardware (computer) to execute the respective processes in the methods or a computer-readable recording medium in which the program is recorded.

According to an aspect of the invention, there is provided a facsimile apparatus including: a main body portion which includes a scanner unit configured to read an original document and generate image data, a facsimile unit capable of transmitting and receiving image data based on a facsimile standard, and a print unit configured to print an image based on the image data on a supplied sheet; and a sheet supply unit which supplies the sheet. The sheet supply unit includes one or more power supply units to which electricity is supplied from the main body portion or another sheet supply unit in a higher level, a power distribution unit which distributes electricity to another sheet supply unit in a lower level, a motor which operates with the electricity supplied from the power supply unit, a notification unit which provides notification of power supply permission to a receiving unit in the sheet supply unit in the lower level, the receiving unit which receives the power supply permission from the main body portion or the notification unit of the sheet supply unit in the higher level, and a control unit which causes the power supply unit to start power supply in response to the reception of the power supply permission by the receiving unit and causes the notification unit to provide the power supply permission in response to a voltage of the supplied electricity exceeding a predetermined threshold value. A stored sheet or a sheet supplied from the sheet supply unit in the lower level is supplied to the sheet supply unit in the higher level or the print unit with power generated by the motor.

According to the aspect of the invention, the electricity (electrical power, current, electrical charge) is supplied from the sheet supply unit in the highest level to the sheet supply unit in the lowest level via the power supply units and the power distribution units in the respective sheet supply units. In contrast, the control unit causes the power supply unit to start the power supply to the side of the motor in response to the reception of the power supply permission from the higher level side by the receiving unit and causes the notification unit to provide notification of the power supply permission to the receiving unit in the sheet supply unit in the lower level in response to the voltage of the supplied electricity exceeding the predetermined threshold value. Therefore, a timing at which the power supply from the power supply unit to the side of the motor is started in each sheet supply unit deviates, and the inrush current generation timings in each sheet supply unit do not overlap. According to the aspect of the invention, the effect of the inrush current generation timing deviating for each sheet supply unit can be achieved merely by mounting a plurality of sheet supply units with the same configuration on the facsimile apparatus. Accordingly, it is possible to solve the problem which is assumed to occur in the related art disclosed in JP-A-2006-19986.

In this case, the control unit may include a switch interposed between the power supply unit and the motor, cause the switch to allow conduction in response to the reception of the power supply permission by the receiving unit, and cause the notification unit to provide the notification of the power supply permission in accordance with the voltage of the electricity, which is supplied to the side of the motor due to the switch allowing the conduction, exceeding the threshold value.

With such a configuration, a timing at which the switch allows conduction deviates for each sheet supply unit, and therefore, overlapping of the inrush current generation timings of each sheet supply unit is avoided.

In this case, the control unit may include a capacitor which has one end connected between the switch and the motor and the other end connected to a ground terminal, a Zener diode with a cathode connected between the switch and the end of the capacitor and a bipolar transistor with a base connected to the side of an anode of the Zener diode, a collector connected to the notification unit, and an emitter connected to a ground terminal. The switch may be a MOSFET. The receiving unit may be connected to a gate of the MOSFET. Electrical charge may be accumulated in the capacitor by a current which passes between a source and a drain of the MOSFET from the power supply unit and is input to the side of the motor by the MOSFET being shifted from the non-conductive state to the conductive state in accordance with a difference between a voltage at the power supply unit and a voltage of the power supply permission received by the receiving unit, and the signal as the power supply permission may be generated on a side of the collector in response to breakdown of the Zener diode caused by an increase in voltage of the electricity supplied to a side of the motor and shifting of the bipolar transistor from the non-conductive state to the conductive state after the breakdown.

With such a configuration, the current (inrush current) which passes through the MOSFET from the power supply unit and is input to the side of the motor disappears from each sheet supply unit when charging of the capacitor is completed, and such an inrush current is generated at a different timing in each sheet supply unit.

In this case, in the control unit, resistors may be provided in all routes between the power supply unit and the switch.

With such a configuration, the resistors are provided on all the routes through which the current can flow to a parasitic capacitance that is present between the power supply unit and the switch, and therefore, it is possible to suppress flow of a kind of inrush current called a spike wave or the like to the parasitic capacitance.

The technical idea of the invention is not implemented only as the aforementioned facsimile apparatus and may be widely implemented as an optional unit connected to a power supply apparatus (the main body portion, for example), a system including the optional unit, and the like. As an example, an optional unit configured to be connected to a power supply apparatus can be understood as an aspect of the invention. According to the aspect, there is provided an optional unit including: a power supply unit to which electricity is supplied from a power supply apparatus or an optional unit in a higher level; a power distribution unit which distributes the electricity to an optional unit in a lower level; an operation unit which operates with the electricity supplied from the power supply unit; a notification unit which provides notification of power supply permission to a receiving unit in the optional unit in the lower level; the receiving unit which receives the power supply permission from the notification unit from the power supply apparatus or the optional unit in the higher level; and a control unit which causes the power supply unit to start the power supply in response to the reception of the power supply permission by the receiving unit and causes the notification unit to provide the power supply permission in accordance with a voltage of the supplied electricity exceeding a predetermined threshold value.

A control system of optional units, which is provided with a power supply apparatus and optional units connected to the power supply apparatus, can be understood as an aspect of the invention. According to the aspect, there is provided a control system in which the power supply apparatus includes a first power distribution unit configured to distribute electricity to an optional unit in the highest connection level, and a first notification unit configured to provide notification of power supply permission to the optional unit in the highest level, in which each of the optional units includes a power supply unit to which the electricity is supplied from the power supply apparatus or an optional unit in a higher level, a second power distribution unit configured to distribute the electricity to an optional unit in a lower level, an operation unit configured to operate with the electricity supplied from the power supply unit, a second notification unit configured to provide the notification of the power supply permission to a receiving unit in the optional unit in the lower level, the receiving unit configured to receive the power supply permission from the power supply apparatus or the optional unit in the higher level, and a control unit configured to cause the power supply unit to start the power supply in response to the reception of the power supply permission by the receiving unit and cause the second notification unit to provide the notification of the power supply permission in accordance with a voltage of the supplied electricity exceeding a predetermined threshold value.

The system may be present in a single independent product or may be present across a plurality of products. In addition, the invention may be implemented as an invention of the respective methods including processing processes corresponding to the facsimile apparatus, the optional unit, the power supply apparatus (the main body portion, for example), and the system, or in various categories including a computer program which causes hardware (computer) to execute the respective processes in the methods or a computer-readable recording medium in which the program is recorded.

According to an aspect of the invention, there is provided a facsimile apparatus including: a main body portion which includes a scanner unit configured to read an original document and generate image data, a facsimile unit capable of transmitting and receiving image data based on a facsimile standard, and a print unit configured to print an image based on the image data on a supplied sheet; and a sheet supply unit which supplies the sheet. The sheet supply unit includes one or more power supply units to which electricity is supplied from the main body portion or another sheet supply unit in a higher level, a power distribution unit which distributes electricity to another sheet supply unit in a lower level, a motor which operates with the electricity supplied from the power supply unit, and a control unit which causes the power distribution unit to start power distribution in accordance with a voltage of the supplied electricity exceeding a predetermined threshold value after the power supply unit starts the power supply. A stored sheet or a sheet supplied from the sheet supply unit in the lower level is supplied to the sheet supply unit in the higher level or the print unit with power generated by the motor.

According to the aspect of the invention, the electricity (electrical power, current, electrical charge) is supplied from the sheet supply unit in the highest level to the sheet supply unit in the lowest level via the power supply units and the power distribution units in the respective sheet supply units. However, the control unit starts the power distribution from the power distribution unit to the power supply unit of the sheet supply unit in the lower level in accordance with the voltage of the electricity, which is supplied from the power supply unit to the side of the motor, exceeding the predetermined threshold value. Therefore, a timing at which the power supply from the power supply unit to the side of the motor is started in each sheet supply unit deviates, and the inrush current generation timings in each sheet supply unit do not overlap. According to the aspect of the invention, the effect of the inrush current generation timing deviating for each sheet supply unit can be achieved merely by mounting a plurality of sheet supply units with the same configuration on the facsimile apparatus. Accordingly, the problem which is assumed to occur in the related art disclosed in JP-A-2006-19986 does not occur.

In this case, the control unit may include a switch interposed between the power supply unit and the power distribution unit and a switch control circuit which shifts the switch from a non-conductive state to a conductive state in accordance with the voltage of the electricity, which is supplied from the power supply unit to the side of the motor, exceeding the threshold value.

With such a configuration, a timing at which the switch allows conduction deviates for each sheet supply unit, and therefore, overlapping of the inrush current generation timings of each sheet supply unit is avoided.

In this case, the control unit may include a capacitor with one end connected between the sheet supply unit and the motor and the other end connected to a ground terminal, the switch may be a MOSFET, and the switch control circuit may include a Zener diode with a cathode connected to the side of the power supply unit and a bipolar transistor with a base connected to a side of an anode of the Zener diode, a collector connected to a gate of the MOSFET, and an emitter connected to a ground terminal. Breakdown of the Zener diode may occur in accordance with an increase in voltage of the electricity supplied from the power supply unit to the side of the motor, and the bipolar transistor may be shifted from the non-conductive state to the conductive state after the breakdown, and the MOSFET may be shifted from the non-conductive state to the conductive state by the bipolar transistor conducting.

With such a configuration, the current (inrush current) which is input from the power supply unit to the side of the motor disappears from each sheet supply unit when charging of the capacitor is completed, and such an inrush current is generated at a different timing in each sheet supply unit.

In this case, in the control unit, resistors may be provided in all routes between the power supply unit and the switch.

With such a configuration, the resistors are provided on all the routes through which the current can flow to a parasitic capacitance that is present between the power supply unit and the switch, and therefore, it is possible to suppress flow of a kind of inrush current called a spike wave or the like to the parasitic capacitance.

In this case, each of sheet supply units may be provided with a common voltage receiving unit to which a voltage common to the respective sheet supply units is applied, and the control unit may be provided with a switch interposed between the common voltage receiving unit and the power distribution unit and a switch control unit which shifts the switch from the non-conductive state to the conductive state in accordance with the voltage of the electricity, which is supplied from the power supply unit to the side of the motor, exceeding the threshold value.

With such a configuration, it is possible to maintain a level of the voltage caused in the sheet supply unit in the lower level due to the power distribution from the power distribution unit to be equal in any of the sheet supply units.

The technical idea of the invention is not implemented only as the aforementioned facsimile apparatus and may be widely implemented as an optional unit connected to a power supply apparatus (the main body portion, for example), a system including the optional unit, and the like. As an example, an optional unit configured to be connected to a power supply apparatus can be understood as an aspect of the invention. According to the aspect, there is provided an optional unit including: a power supply unit to which electricity is supplied from the power supply apparatus or an optional unit in a higher level; a power distribution unit which distributes the electricity to an optional unit in a lower level; an operation unit which operates with the electricity supplied from the power supply unit; and a control unit which causes the power distribution unit to start the power distribution in accordance with a voltage of the supplied electricity exceeding a predetermined threshold value after the power supply unit starts the power supply.

In addition, a control system of optional units, which is provided with a power supply apparatus and optional units connected to the power supply apparatus, can be understood as an aspect of the invention. According to the aspect, there is provided a control system, in which the power supply apparatus is provided with a first power distribution unit configured to distribute electricity to an optional unit in the highest connection level, and in which each of the optional units is provided with a power supply unit to which the electricity is supplied from the power supply apparatus or an optional unit in a higher level, a second power distribution unit configured to distribute the electricity to an optional unit in a lower level, an operation unit configured to operate with the electricity supplied from the power supply unit, and a control unit configured to cause the second power distribution unit to start the power distribution in accordance with a voltage of the supplied electricity exceeding a predetermined threshold value after the power supply unit starts the power supply.

The system may be present in a single independent product or may be present across a plurality of products. In addition, the invention may be implemented as an invention of the respective methods including processing processes corresponding to the facsimile apparatus, the optional unit, the power supply apparatus (the main body portion, for example), and the system, or in various categories including a computer program which causes hardware (computer) to execute the respective processes in the methods or a computer-readable recording medium in which the program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Outline of Apparatus Configuration

Figure 1:
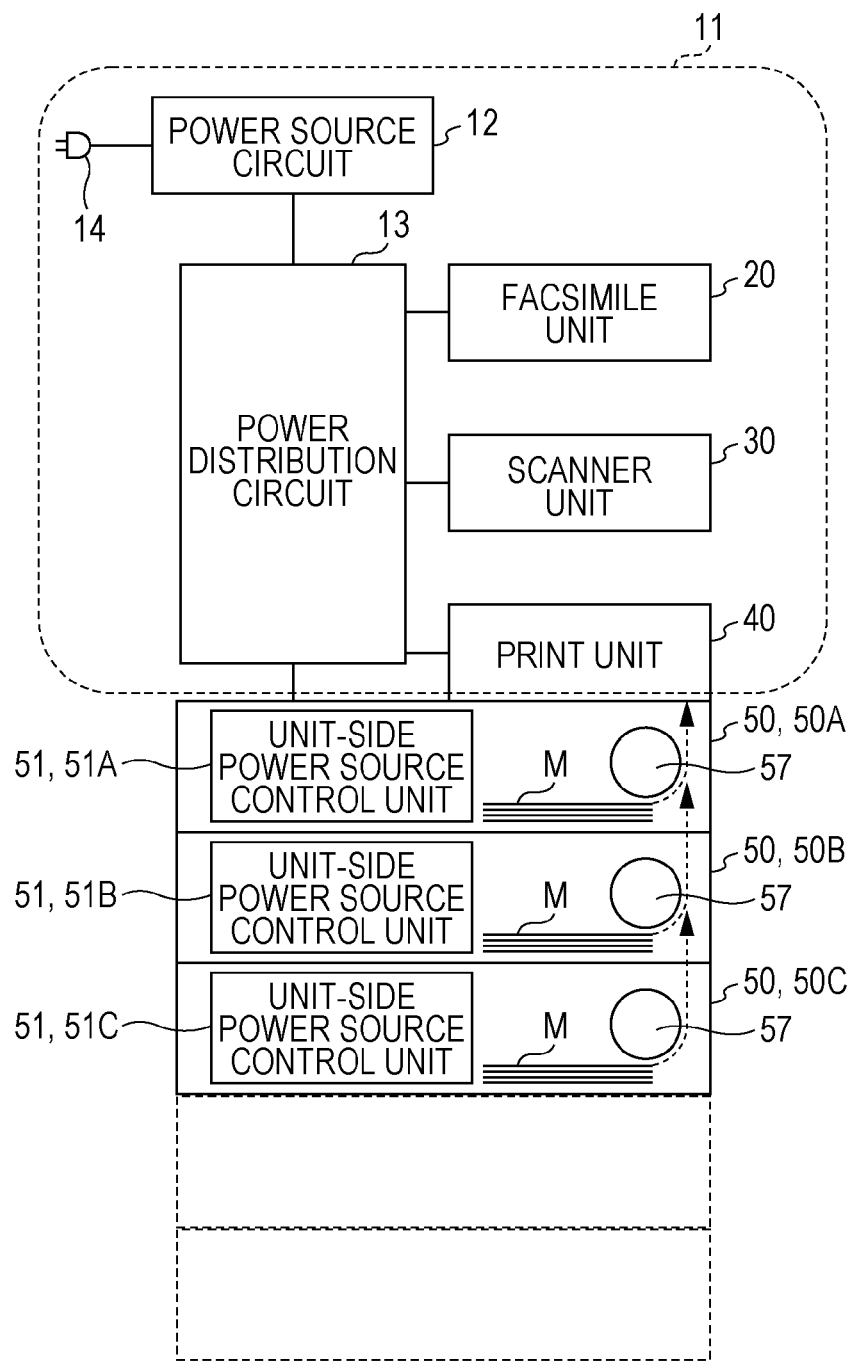
FIG. 1 is a diagram schematically showing an apparatus configuration according to a first embodiment.

FIG. 1 schematically shows a configuration of a facsimile apparatus 10 according to a first embodiment. The facsimile apparatus 10 is also referred to as a multifunctional machine 10. The multifunctional machine 10 is provided with a main body portion 11. The main body portion 11 includes, for example, a power source circuit 12, a power distribution circuit 13, a facsimile unit 20, a scanner unit 30, and a print unit 40. In addition, one or more sheet supply units 50 as a kind of "optional unit" which can be added by a user to the main body portion 11 are mounted on the multifunctional machine 10. The sheet supply unit 50 may be referred to as a sheet supply cassette or the like. FIG. 1 shows an example in which three sheet supply units 50 are mounted.

A sheet supply unit 50 which is located at the closest position (the highest level) to the print unit 40 when mounted on the multifunctional machine 10 is also referred to as a sheet supply unit 50A, a sheet supply unit 50 which is located in a lower level immediately below the sheet supply unit 50A is also referred to as a sheet supply unit 50B, and a sheet supply unit 50 which is located in a lower level immediately below the sheet supply unit 50B is also referred to as a sheet supply unit 50C. A sheet supply unit 50 may further be added at a position below the sheet supply unit 50C (see the position represented by a broken line in a rectangular shape in FIG. 1).

In the embodiment, the higher level and the lower level of the sheet supply units 50 relative to the print unit 40 are considered in such a manner that the sheet supply unit which is located closer to the print unit 40 is in the higher level. However, the higher level and the lower level do not necessarily mean an upper side and a lower side in the vertical direction. In relation to positional relationships between the respective sheet supply units 50 which are connected in series to the power distribution circuit 13, the sheet supply unit 50 which is located on the side closer to the power distribution circuit 13 is considered to be in a higher level as will be described later.

In the main body portion 11, the power source circuit 12 performs voltage transformation, AC/DC inversion, and the like on an AC voltage which is input from an AC plug 14 to generate a DC voltage at a predetermined level (about 42 V, for example) for driving the respective loads, and outputs the DC voltage to the power distribution circuit 13. The power distribution circuit 13 supplies the voltage, which is output from the power source circuit 12, to the respective loads including the facsimile unit 20, the scanner unit 30, the print unit 40, and the sheet supply unit 50.

The facsimile unit 20 is provided with a modem to be connected to a facsimile communication line which is not shown in the drawing. The facsimile unit 20 receives image data which is faxed from the outside via the communication line, decompresses the received image data, compresses image data which is read and generated by the scanner unit 30, and faxes the compressed image data to the outside via the communication line.

The scanner unit 30 reads an original document set on an original document table, an auto document feeder (ADF), or the like with an optical sensor and generates image data (bitmap data, for example) of the original document. The image data generated by the scanner unit 30 may become a target for printing by the print unit 40 or become a target for faxing by the facsimile unit 20 as described above.

The print unit 40 is a unit (print engine) which prints images on sheets by using coloring materials such as ink and toner. The print unit 40 performs printing based on image data received and decompressed by the facsimile unit 20, image data generated by the scanner unit 30, or image data received from another image data input source which is not shown in the drawing (a personal computer (PC) which is connected to the multifunctional machine 10, a mobile terminal, a digital still camera, or the like). A sheet supply tray which is not shown in the drawing may be provided in the print unit 40. That is, the print unit 40 performs printing on a sheet which is stored on the sheet supply tray provided in the print unit itself or a sheet M which is supplied from the sheet supply unit 50. Therefore, even if the sheet supply unit 50 is not mounted on the multifunctional machine 10, the main body portion 11 can operate normally alone. However, according to the embodiment, one or more sheet supply units 50 are mounted on the multifunctional machine 10 as described above.

The respective sheet supply units 50 have the same configuration, and each sheet supply unit 50 is provided with a unit-side power source control unit 51, a roller 57, and the like. The unit-side power source control unit 51 controls operations of the rollers 57 and the like with supplied electricity. Each sheet supply unit 50 stores the sheets M on a built-in tray, rotates the roller 57 with power generated by a motor 53 which will be described later, and supplies the sheets M to the higher level.

In the example shown in FIG. 1, the sheet supply unit 50C in the lowest level supplies the sheets M stored in the sheet supply unit 50C itself to the sheet supply unit 50B in the higher level. The sheet supply unit 50B supplies the sheets M stored in the sheet supply unit 50B itself or the sheets M supplied from the sheet supply unit 50C in the lower level to the sheet supply unit 50A in the higher level. The sheet supply unit 50A in the highest level supplies the sheets M stored in the sheet supply unit 50A itself or the sheets M supplied from the sheet supply unit 50B in the lower level to the print unit 40. FIG. 1 shows an example of a flow of the sheets M with broken arrows (see JP-A-2002-255382 as necessary).

Hereinafter, the sheet-side power source control unit 51 provided in the sheet supply unit 50A will also be referred to as a unit-side power source control unit 51A, the unit-side power source control unit 51 provided in the sheet supply unit 50B will also be referred to as a unit-side power source control unit 51B, and the unit-side power source control unit 51 provided in the sheet supply unit 50C will also be referred to as a unit-side power source control unit 51C. The multi-functional machine 10 may be provided with a display unit (a liquid crystal panel, for example) or an operation unit (buttons, keys, or a touch panel, for example), which are not shown in the drawing, for receiving various instructions from the user or presenting states of the multifunctional machine 10 to the user. The multifunctional machine 10 may be provided with a phone call (telephone) function.

The aforementioned configuration of the facsimile apparatus 10 (FIG. 1) is the same as those in the second and third embodiments which will be described later.

Configuration for Delaying Inrush Current Occurrence Timing

On the assumption of the aforementioned configuration, a description will be given of a configuration according to the first embodiment for delaying (differentiating) an inrush current occurrence timing for each optional unit.

Figure 2:
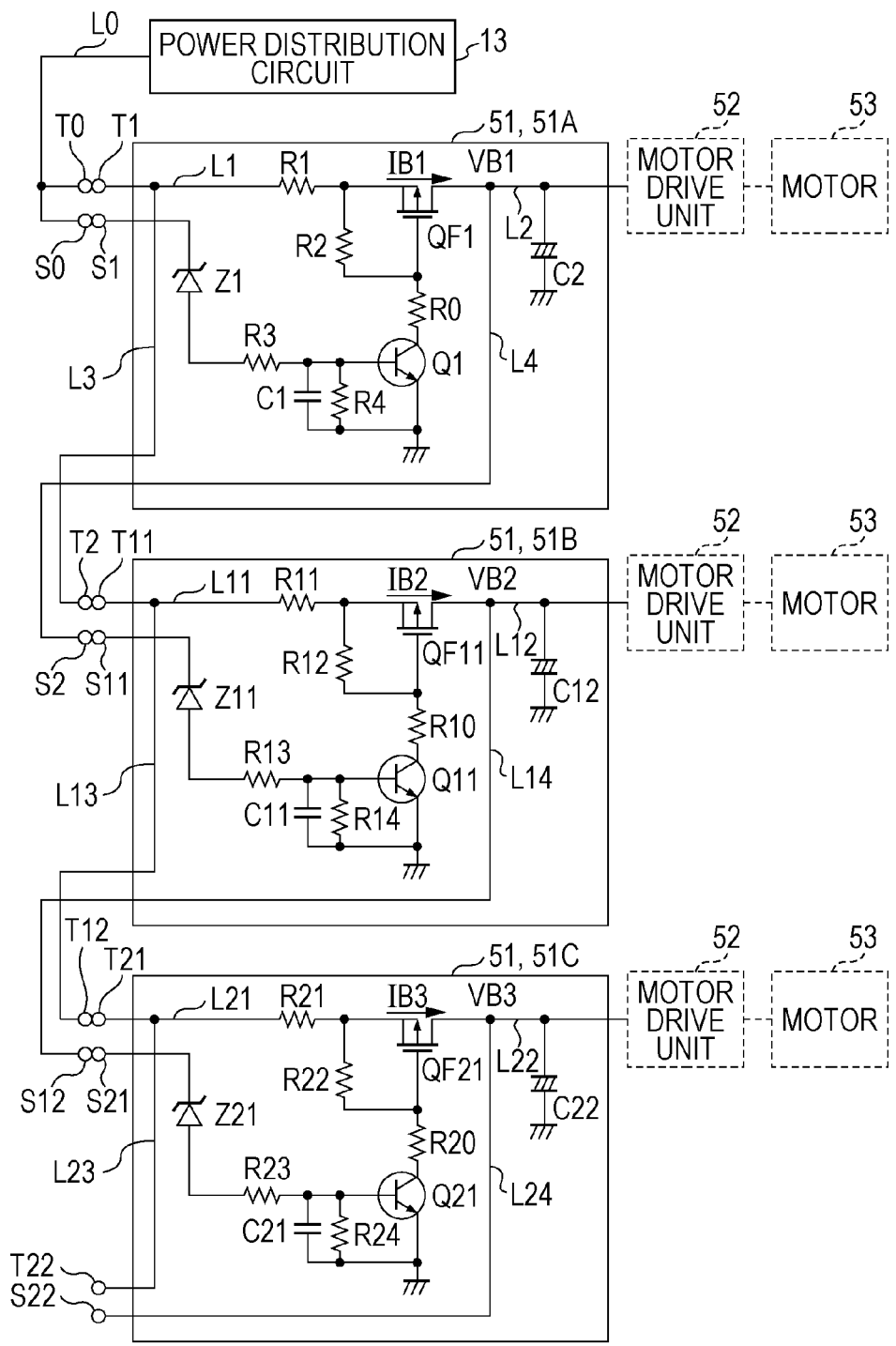
FIG. 2 is a circuit diagram showing, as an example, a connection state of unit-side power source control units.

FIG. 2 shows an example of a connection state and the like of the respective unit-side power source control units 51 (51A, 51B, and 51C) according to the first embodiment.

As shown in FIGS. 1 and 2, all the unit-side power source control units 51 have the same configuration, and each unit-side power source control unit 51 is provided with an input terminal ("T1" for the unit-side power source control unit 51A, "T11" for the unit-side power source control unit 51B, and "T21" for the unit-side power source control unit 51C; hereinafter, corresponding components will be referred to in the same manner), an input terminal (S1, S11, or S21), an output terminal (T2, T12, or T22), and an output terminal (S2, S12, or S22). In addition, a voltage supply line L0 extends from the power distribution circuit 13 in the main body portion 11, and a tip end of the voltage supply line L0 branches into output terminals T0 and S0.

If the sheet supply units 50A, 50B, and 50C are added to the main body portion 11, the input terminal T1 and the input terminal S1 provided in the unit-side power source control unit 51A in the sheet supply unit 50A in the highest level are connected to the output terminal T0 and the output terminal S0, respectively.

Similarly, the input terminal T11 provided in the unit-side power source control unit 51B in the sheet supply unit 50B is connected to the output terminal T2 provided in the unit-side power source control unit 51A, and the input terminal S11 provided in the unit-side power source control unit 51B in the sheet supply unit 50B is connected to the output terminal S2 provided in the unit-side power source control unit 51A. The input terminal T21 provided in the unit-side power source control unit 51C in the sheet supply unit 50C is connected to the output terminal T12 provided in the unit-side power source control unit 51B, and the input terminal S21 provided in the unit-side power source control unit 51C in the sheet supply unit 50C is connected to the output terminal S12 provided in the unit-side power source control unit 51B.

In the unit-side power source control units 51, the input terminals (T1, T11, and T21) are connected to input signal lines (L1, L11, and L21), and the input signal lines (L1, L11, and L21) branch into voltage supply lines (L3, L13, and L23), respectively. Furthermore, the voltage supply lines (L3, L13, and L23) are connected to the output terminals (T2, T12, and T22). Accordingly, when the power distribution circuit 13 outputs a voltage of about 42 V, for example, to the voltage supply line L0, the voltage is supplied to the respective unit-side power source control units 51 through a continuous route of the voltage supply line L0, the output terminal T0, the input terminal T1, the input signal line L1, the voltage supply line L3, the output terminal T2, the input terminal T11, the input signal line L11, the voltage supply line L13, the output terminal T12, the input terminal T21, the input signal line L21, . . . .

In the unit-side power source control units 51, the input signal lines (L1, L11, and L21) are connected to sources of MOSFETs (QF1, QF11, and QF21) as switches via resistors (R1, R11, and R21), and drains of the MOSFETs (QF1, QF11, and QF21) are connected to the output signal lines (L2, L12, and L22). The MOSFETs are a kind of field-effect transistor.

In addition, resistors (R2, R12, and R22) are interposed between the gates of the MOSFETs (QF1, QF11, and QF21) and points between the resistors (R1, R11, and R21) and the MOSFETs (QF1, QF11, and QF21). The output signal lines (L2, L12, and L22) are connected to motor drive units 52 provided in the respective sheet supply units 50.

The motor drive units 52 are circuits configured to control driving of the motors 53 for rotating the rollers 57. The motors 53 correspond to an example of the "operation unit" in the claims.

In the unit-side power source control units 51, the input terminals (S1, S11, and S21) are connected to cathodes of Zener diodes (Z1, Z11, and Z21). Anodes of the Zener diodes (Z1, Z11, and Z21) are connected to bases of transistors (Q1, Q11, and Q21), which are NPN-type bipolar transistors, via resistors (R3, R13, and R23). Each of the transistors (Q1, Q11, and Q21) corresponds to the "first bipolar transistor" in the claims.

The transistors (Q1, Q11, and Q21) are configured such that collectors thereof are connected to the gates of the MOSFETs (QF1, QF11, and QF21) and emitters thereof are connected to grounds. However, resistors (R0, R10, and R20) are interposed between the collectors of the transistors (Q1, Q11, and Q21) and the gates of the MOSFETs (QF1, QF11, and QF21). In addition, each of the resistors (R2, R12, and R22) which has an end connected between the resistor (R1, R11, or R21) and the MOSFET (QF1, QF11, or QF21) has the other end connected between the resistor (R0, R10, or R20) and the MOSFET (QF1, QF11, or QF21). Moreover, each of capacitors (C1, C11, and C21) and each of resistors (R4, R14, and R24) respectively have one end connected between the resistor (R3, R13, or R23) and the base of the transistor (Q1, Q11, or Q21). Furthermore, each of the capacitors (C1, C11, and C21) and each of the resistors (R4, R14, and R24) respectively have the other end connected to the emitter of the transistor (Q1, Q11, or Q21).

Moreover, in the unit-side power source control units 51, the output signal lines (L2, L12, and L22) branch into notification lines (L4, L14, and L24), and the notification lines (L4, L14, and L24) are connected to the output terminals (S2, S12, and S22). In addition, each of electrolytic capacitors (C2, C12, and C22) has one end connected to the output signal line (L2, L12, or L22) at a point before the motor drive unit 52, and each of the electrolytic capacitors (C2, C12, and C22) has the other end connected to grounds.

In a case in which a voltage is supplied from the power distribution circuit 13 as described above in the aforementioned configuration and voltage input from the input terminal S1 (via the voltage supply line L0 and the output terminal S0) increases to a predetermined level, breakdown of the Zener diode Z1 in the unit-side power source control unit 51A occurs, and a current flows from the cathode to the anode side. In doing so, a base potential of the transistor Q1 increases, a voltage in accordance with a ratio between the resistor R3 and the resistor R4 occurs between the base and the emitters of the transistor Q1, and the transistor Q1 is shifted from a non-conductive state (OFF state) to a conductive state (ON state). The capacitors (C1, C11, and C21) stabilize the switching operation of the transistors (Q1, Q11, and Q21) to the ON state and further delay timing of the switching. However, the capacitors (C1, C11, and C21) are not necessarily provided.

If the transistor Q1 in the unit-side power source control unit 51A is brought into the ON state, then a current flows to the transistor Q1 in a route from the input terminal T1 through the resistors R1, R2, and R0, a voltage corresponding to a ratio between the resistors R2 and R0 is applied between the gate and the source of the MOSFET QF1, and the MOSFET QF1 is shifted from the OFF state to the ON state. As a result, a current (inrush current IB1) passes from the input terminal T1 through the resistor R1 and between the source and the drain of the MOSFET QF1 and flows to the output signal line L2, and a voltage VB1 occurs in the output signal line L2. Due to the inrush current IB1, electrical charge is accumulated in the electrolytic capacitor C2, and if the electrolytic capacitor C2 is fully charged, the inrush current IB1 disappears. Thereafter, the voltage VB1 is stably supplied to the motor drive unit 52 to which the output signal line L2 is connected, and the motor drive unit 52 controls the motor 53 by using the supplied voltage.

The voltage VB1 is also output to the output terminal S2 via the notification line L4. The output terminal S2 is connected to the input terminal S11 of the unit-side power source control unit 51B provided in the sheet supply unit 50B in the lower level. Therefore, the voltage VB1 is input from the output terminal S2 to the unit-side power source control unit 51B via the input terminal S11. Thereafter, the same operations as those described above with reference to the example of the unit-side power source control unit 51A occur in turn in the unit-side power source control unit 51B and the following unit-side power source control unit. That is, in the unit-side power source control unit 51B, the transistor Q11 is brought into the ON state in accordance with the increase in voltage (voltage VB1) input from the input terminal S11, and if the MOSFET QF11 is brought into the ON state thereafter, then a current (inrush current IB2) passes from the input terminal T11 through the resistor R11 and the MOSFET QF11 and flows to the output signal line L12, and a voltage VB2 occurs in the output signal line L12. Due to the inrush current IB2, electrical charge is accumulated in the electrolytic capacitor C12, and if the electrolytic capacitor C12 is fully charged, then the inrush current IB2 disappears. Thereafter, the voltage VB2 is stably supplied to the motor drive unit 52 to which the output signal line L12 is connected.

Furthermore, the transistor Q21 in the unit-side power source control unit 51C is brought into the ON state in accordance with the increase in voltage (voltage VB2) which is input to the unit-side power source control unit 51C via the notification line L14, the output terminal S12, and the input terminal S21. If the MOSFET QF21 is brought into the ON state thereafter, a current (inrush current IB3) passes from the input terminal T21 through the resistor R21 and the MOSFET QF21 and flows to the output signal line L22, and a voltage VB3 occurs in the output signal line L22. Due to the inrush current IB3, electrical charge is accumulated in the electrolytic capacitor C22, and if the electrolytic capacitor C22 is fully charged, the inrush current IB3 disappears. Thereafter, the voltage VB3 is stably supplied to the motor drive unit 52 to which the output signal line L22 is connected. Even if another unit-side power source control unit 51 is further connected to a lower level below the unit-side power source control unit 51C, the same operations occur in turn.

According to the above description of FIG. 2, the input terminals (T1, T11, and T21) correspond to the voltage receiving unit configured to receive a drive voltage supplied from the main body portion 11 or the sheet supply unit 50 in the higher level, and the output terminals (T2, T12, and T22) correspond to the voltage supply unit configured to supply the voltage to the voltage receiving unit in the sheet supply unit 50 in the lower level. In addition, the input terminals (S1, S11, and S21) correspond to the notification input unit configured to input a notification signal (a voltage output from the power distribution circuit 13 to the voltage supply line L0 or the voltage VB1, VB2, . . . ) from the main body portion 11 or the sheet supply unit 50 in the higher level, and the output terminals (S2, S12, and S22) correspond to the notification output unit configured to output the voltage, which is supplied from the voltage receiving unit to the motor 53, as a notification signal (the voltage VB1, VB2, and VB3) to the notification input unit in the sheet supply unit 50 in the lower level.

Then, the unit-side power source control units 51 (51A, 51B, and 51C) cause the voltage receiving units (T1, T11, and T21) to start supply of voltage to the motor 53 in accordance with a voltage of the notification signal input from the notification input units (S1, S11, and S21) exceeding a predetermined threshold value. In addition, at least a part of the configuration including the Zener diodes (Z1, Z11, and Z21), the resistors (R3, R13, and R23), the transistors (Q1, Q11, and Q21), the capacitors (C1, C11, and C21), and the resistors (R4, R14, and R24) in the unit-side power source control units 51 (51A, 51B, and 51C) corresponds to the switch control circuit configured to switch the switches (QF1, QF11, and QF21) from the OFF state to the ON state in accordance with the voltage of the notification signal, which is input from the notification input units (S1, S11, and S21), exceeding the threshold value. The threshold value described herein indicates a level of the notification signal, which is required to turn on the transistors (Q1, Q11, and Q21), for example.

Figure 3A:
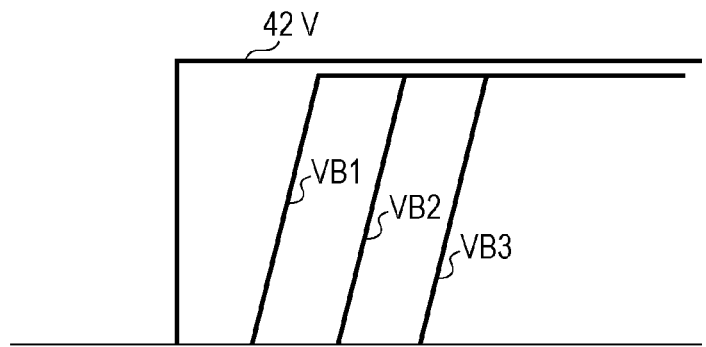
FIGS. 3A to 3E are diagrams showing, as an example, variations in voltage and current with respect to time.
Figure 3B:
Figure 3C:
Figure 3D:
Figure 3E:

FIGS. 3A to 3E are diagrams showing, as an example, variations in voltage and current with respect to time. A description will be given of a result of the configuration shown in FIG. 2 with reference to FIGS. 3A to 3E. FIG. 3A shows variations in voltage with respect to time, and shows a voltage (42 V, for example) output from the power distribution circuit 13 to the voltage supply line L0 and voltages VB1, VB2, and VB3 output from the unit-side power source control units 51A, 51B, and 51C, respectively. In addition, FIGS. 3B, 3C, 3D, and 3E show variations in current with respect to time. FIG. 3B shows the inrush current IB1 which flows when the MOSFET QF1 in the unit-side power source control unit 51A is turned on. FIG. 3C shows the inrush current IB2 which flows when the MOSFET QF11 in the unit-side power source control unit 51B is turned on. FIG. 3D shows the inrush current IB3 which flows when the MOSFET QF21 in the unit-side power source control unit 51C is turned on. FIG. 3E shows variations in current I42 that the power distribution circuit 13 causes to flow to the voltage supply line L0. Such an inrush current occurs in a case in which power supply to the main body portion 11 is started while the plurality of sheet supply units 50 are mounted on the main body portion 11 and a case in which the plurality of sheet supply units 50 are connected to the main body portion 11, to which the power supply has been started, at the same time (the sheet supply units 50 are connected in a state in which the power distribution circuit 13 supplies a voltage to the voltage supply line L0; this is also called live insertion), for example.

According to the embodiment, the inrush current (IB2) in a certain unit-side power source control unit 51 (the unit-side power source control unit 51B, for example) does not occur until the switch (QF11) is turned on by the voltage (VB1), which is output from another unit-side power source control unit 51 (the unit-side power source control unit 51A) in the higher level, exceeding a predetermined value after the occurrence of the inrush current (IB1) in the unit-side power source control unit 51 (the unit-side power source control unit 51A) in the level higher than the unit-side power source control unit 51, as can be understood from the description of FIG. 2 and FIGS. 3A to 3E. For this reason, the occurrence timing of the inrush current which is generated in the respective sheet supply units 50 (the unit-side power source control units 51) deviates. Therefore, a peak value of the current I42 that the power distribution circuit 13 in the main body portion 11 causes to flow does not become an excessively large value as a value of the total inrush current in the plurality of sheet supply units 50 and always becomes a value which is reduced to be equal to or less than a specific value (equal to or less than a peak value of the inrush current which occurs in a single unit-side power source control unit 51), and the burden on the main body portion 11 decreases.

According to the embodiment, the effect as described above with reference to FIGS. 3A to 3E is achieved merely by mounting a number desired by the user of sheet supply units 50 with the same configuration on the main body portion 11. That is, it is possible to reliably cause the inrush current occurrence timing to deviate without requiring complicated design or operations such as an operation of differentiating setting of a time constant for each optional unit as disclosed in JP-A-2006-19986.

In the timing generation circuit disclosed in JP-A-2006-19986, a difference between an originally intended response speed and an actual response speed deviates for each timing generation circuit due to temporal degradation of the capacitors, variations in environmental temperature, and the like. For this reason, there is a need to provide a margin in order to be able to absorb the variations in the respective timing generation circuits (a difference in response speed between the timing generation circuits) at a stage of design in order to reliably secure the difference between the response speeds of the respective timing generation circuits, and as a result, it takes a long time to activate the plurality of optional units.

However, since the switch in the optional unit in the lower level, which allows conduction, is controlled in accordance with a level of the voltage (notification signal) generated by the switch in the optional unit in the higher level, which allows conduction, in the embodiment, the timing of the switches allowing conduction reliably deviates between the optional units regardless of degradation of the capacitors and the like. Accordingly, an increase in time required for the plurality of optional units to be activated as in JP-A-2006-19986 does not happen.

In addition, employment of design and a specification which can sufficiently undergo a steep increase in inrush current due to the optional units, which is observed in the related art, on the side of the main body portion brings about an increase in size and an increase in cost of the product. Particularly, the number of optional units to be mounted on the main body portion is arbitrarily decided by each user, and there is also a user who uses no optional unit. For this reason, it is desirable to avoid the increase in cost due to the design and the specification on the side of the main body portion. According to the embodiment, it is not particularly necessary to handle the increase in inrush current due to an increase in number of the sheet supply units 50 on the side of the main body portion 11. For this reason, the power distribution circuit 13 and the like in the main body portion 11 can be provided in simple configurations, which does not result in an increase in cost and an increase in size of the main body portion 11.

Figure 4:
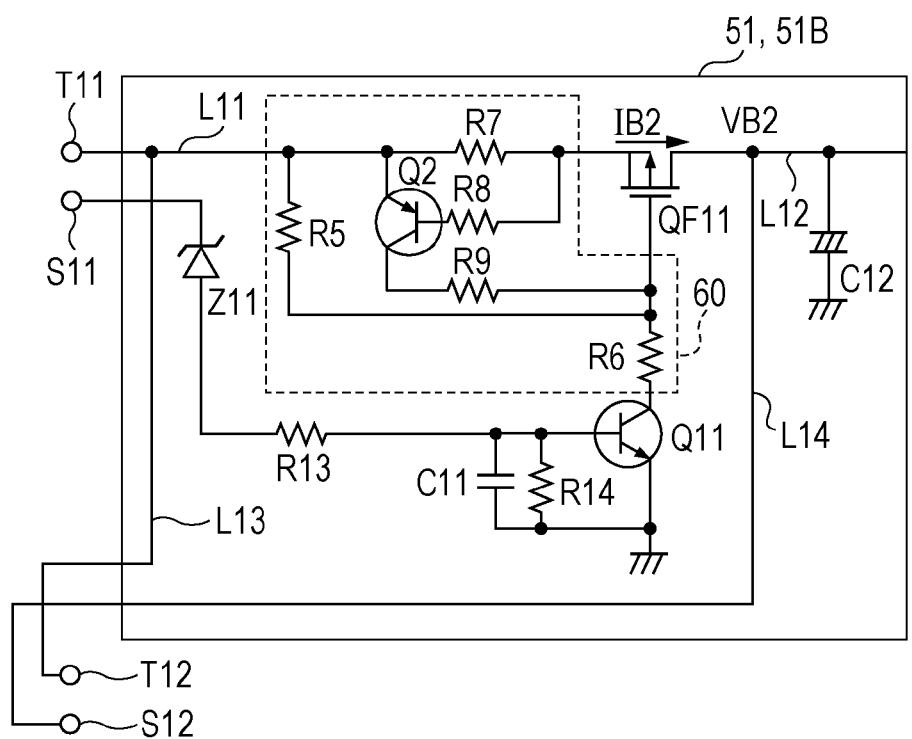
FIG. 4 is a circuit diagram showing, as an example, another configuration.

Another Configuration
Suppression of Occurrence of Inrush Current by Parasitic Capacitance FIG. 4 is a diagram showing a circuit configuration including a current restriction circuit and shows a configuration of the unit-side power source control units 51 as a different example from that in FIG. 2. Although FIG. 4 shows the unit-side power source control unit 51B as a representative example of the respective unit-side power source control units 51, the same configuration as that in FIG. 4 can be employed for the other unit-side power source control units 51A and 51C. FIG. 4 is different from FIG. 2 in that a current restriction circuit 60 surrounded by the broken line is provided instead of the resistors R11, R12, and R10 (the resistors R1, R2, and R0 and the resistors R21, R22, and R20) in FIG. 2. However, a part of the area surrounded by the broken line or the entire area may be referred to as the current restriction circuit 60.

In the current restriction circuit 60, the input signal line L11 is provided with a resistor R7. The resistor R7 corresponds to a first resistor provided between the voltage receiving unit (input terminal T11) and the source of the MOSFET QF11. In addition, the current restriction circuit 60 includes a PNP-type bipolar transistor Q2 (second bipolar transistor) configured such that an emitter is connected to a connection point (first connection point) between the voltage receiving unit (input terminal T11) and the first resistor (resistor R7), a base is connected to a connection point (second connection point) between the first resistor (resistor R7) and the source of the MOSFET QF11, and a collector is connected to the gate of the MOSFET QF11. A second resistor (resistor R8) is provided between the base of the transistor Q2 and the second connection point, and a third resistor (resistor R9) is provided between the collector of the transistor Q2 and the gate of the MOSFET QF11.

Furthermore, one end of a resistor R5 is connected to a connection point, which is located closer to the input terminal T11 side than the first connection point, on the input signal line L11, and the other end of the resistor R5 is connected to a connection point, which is located closer to the transistor Q11 than the connection point between the gate of the MOSFET QF11 and the resistor R9, on the line connecting the collector of the transistor Q11 to the gate of the MOSFET QF11. Furthermore, a resistor R6 is provided at a location, which is closer to the transistor Q11 than the connection point with the resistor R5, on the line connecting the collector of the transistor Q11 to the gate of the MOSFET QF11. In the unit-side power source control unit 51, the resistors (R5, R7, R8, and R9) are provided at all the routes between the voltage receiving unit (input terminal T11) and the switch (MOSFET QF11) as described above.

A description will be given of a current restriction function of the current restriction circuit 60. Under the condition in which the voltage (42 V, for example) output from the power distribution circuit 13 is supplied to the input terminal T11 and the notification signal (voltage VB1) from the sheet supply unit in the higher level is supplied to the input terminal S11 as described above, the transistor Q11 requires a specific time in accordance with an increase in potential of the notification signal to be shifted to the ON state. If the transistor Q11 is turned on, a current flows to the transistor Q11 in a route through the resistors R5 and R6 from the input terminal T11, and a voltage in accordance with a ratio between the resistors R5 and R6 is applied between the gate and the source of the MOSFET QF11, and the MOSFET QF11 is shifted to the ON state. In doing so, the inrush current IB2 passing through the MOSFET QF11 from the input signal line L11 flows, and the voltage VB2 rises in the output signal line L12 in the same manner as in the configuration shown in FIG. 2.

If the MOSFET QF11 conducts as described above, a voltage occurs in the resistor R7 due to the current flowing through the input signal line L11. Then, a voltage occurs between the base and the emitter of the transistor Q2, and the transistor Q2 is shifted to the ON state. If the transistor Q2 is turned on, a current flows to the transistor Q11 in a route through the transistor Q2, the resistors R9 and R6 from the input terminal T11, and the amount of current flowing through the resistor R7 decreases in accordance with an increase in the current flowing to the transistor Q11. If the amount of current flowing through the resistor R7 decreases, the transistor Q2 returns to the OFF state. Thereafter, the current passing through the resistor R7 and flowing into the MOSFET QF11 is restricted (equilibrated) to a specific level or lower by the transistor Q2 repeatedly being in the ON state and the OFF state. In addition, it is possible to state that the resistors R1, R11, and R21 shown in FIG. 2 are also circuits which have a function of restricting the current flowing into the MOSFETs (QF1, QF11, and QF21) though the resistors R1, R11, and R21 do not restrict such a current as much as the current restriction circuit 60 does.

Here, a so-called parasitic capacitance is present in a switch element including the MOSFET QF11, for example. In a case of live insertion of the sheet supply units 50 into the main body portion 11, in particular, a kind of inrush current called a spike wave or the like instantaneously flows into such a parasitic capacitance and may cause certain failures. Since the resistors (R5, R7, R8, and R9) are provided on all the routes between the input terminal T11 and the MOSFET QF11 in the embodiment, it is possible to reliably restrict the inrush current flowing to the parasitic capacitance. In addition, it is possible to state that the resistor R9 is a resistor which is unnecessary for the aforementioned function of restricting the current by the current restriction circuit 60. However, the embodiment employs the configuration in which the resistor R9 is also provided in order to reliably suppress the inrush current flowing in the route from the input terminal T11 to the MOSFET QF11, which occurs at the time of the live insertion as described above, for example.

Modification Example

The invention is not limited to the aforementioned embodiments, and can be implemented in various configurations without departing from the gist thereof. For example, it is possible to employ modification examples as will be described below. Configurations as combinations of the respective embodiments and modification examples are also within the scope of the invention.

In a case of assuming the optional units to be the sheet supply units 50 as described above, it is possible to apply the invention to any product as long as the sheet supply units 50 can be additionally mounted thereon. That is, the invention can be applied to any product such as a printer, which requires supply of sheets, instead of a facsimile apparatus and a multifunctional machine.

In addition, the main body portion 11 can be referred to as a power supply apparatus since the main body portion 11 supplies a drive voltage to the respective optional units. The system including such a power supply apparatus and optional units may be implemented as an independent product such as a facsimile apparatus, a multifunctional machine, or a printer or may be constructed across a plurality of products or apparatuses.

In addition, the optional units are not limited to the sheet supply units. That is, the relationship between the sheet supply apparatus and the optional units, which is proposed by the invention, may be widely applied to relationships between a side (master) controlling a system which is constructed in a specific scene for performing power supply and communication and a side (slave) being connected to and controlled by the system. For example, a plurality of batteries (cells) to be mounted on an electrical vehicle may be assumed. An in-vehicle controller configured to control operations of the batteries corresponds to the power supply apparatus proposed by the invention, and the respective batteries controlled by the controller correspond to the optional units proposed by the invention. Alternatively, a PC and additional devices that a user arbitrarily adds to the PC may be assumed. The PC corresponds to the power supply apparatus proposed by the invention, and the additional devices correspond to the optional units proposed by the invention.

From such a wide viewpoint of not limiting the invention to a product on which sheet supply units are mounted, it is possible to state that the embodiment discloses a configuration of an optional unit configured to be connected, in series, to a power supply apparatus for supplying a drive voltage, the operation unit including: a voltage receiving unit configured to receive a voltage supplied from the power supply apparatus or an optional unit in a higher connection level; a voltage supply unit configured to supply the voltage to a voltage receiving unit in an optional unit in a lower connection level; an operation unit configured to operate based on the voltage received by the voltage receiving unit; a notification input unit to which the power supply apparatus or the optional unit in the higher level inputs a notification; a notification output unit configured to output the voltage, which is supplied from the voltage receiving unit to the operation unit, as the notification signal to the notification input unit in the optional unit in the lower level; and a control unit configured to start the supply of the voltage from the voltage receiving unit to the operation unit in accordance with a voltage of the notification signal, which is input by the notification input unit, exceeding a predetermined value.

Furthermore, it is possible to state that the embodiment discloses a configuration of a control system of optional units, which is provided with a power supply apparatus for supplying a drive voltage and optional units connected, in series, to the power supply apparatus, the power supply apparatus including a first voltage supply unit (output terminal T0) configured to supply a voltage to an optional unit in the highest connection level and a first notification output unit (output terminal S0) configured to output a notification signal to the optional unit in the highest level, each of the optional units including a voltage receiving unit (input terminal T1, T11, or T21) configured to receive the voltage supplied from the power supply apparatus or an optional unit in a higher level, a second voltage supply unit (output terminal T2, T12, or T22) configured to supply the voltage to a voltage receiving unit in an optional unit in the lower level, an operation unit which operates based on the voltage received by the voltage receiving unit, a notification input unit (input terminal S1, S11, or S21) to which the power supply apparatus or the optional unit in the higher level inputs a notification signal, a second notification output unit (output terminal S2, S12, or S22) configured to output the voltage, which is supplied from the voltage receiving unit to the operation unit, as the notification signal to the notification input unit in the optional unit in the lower level, and a control unit configured to start the supply of the voltage from the voltage receiving unit to the operation unit in accordance with a voltage of the notification signal, which is input by the notification input unit, exceeding a predetermined threshold value.

In addition, a part or an entirety of wiring between the power supply apparatus and the optional units or between the optional units may be replaced with wireless connection. Although the type of the wireless connection may be selected arbitrarily, the supply of the voltage may be replaced with wireless power supply based on an electromagnetic induction scheme, or the notification signal may be sent in a wireless manner by using light with a light intensity in accordance with a voltage.

2. Second Embodiment

On the assumption of the configuration shown in FIG. 1, a description will be given of a second embodiment for delaying (causing deviation of) an inrush current generation timing at each optional unit.

The basic configuration of the facsimile apparatus 10 is the same as that in the first embodiment (FIG. 1) as described above. However, according to the second embodiment, unit-side power source control units 151 (151A, 151B, and 151C) are provided instead of the unit-side power source control units 51 (51A, 51B, and 51C) in the first embodiment, and a power distribution circuit 113 is provided instead of the power distribution circuit 13.

Although the respective sheet supply unit 50 are assumed to have the same configuration in the first embodiment, the sheet supply unit 50A has a configuration which is partially different from that of the sheet supply units 50B and 50C. The circuit configuration of the unit-side power source control unit 151A configuring the sheet supply unit 50A is different in that a switch drive delay unit 60A and a switch drive unit 61A are provided in addition to the circuit configuration of the unit-side power source control units 151B and 151C configuring the sheet supply units 50B and 50C though a detailed description will be given later.

Figure 5:
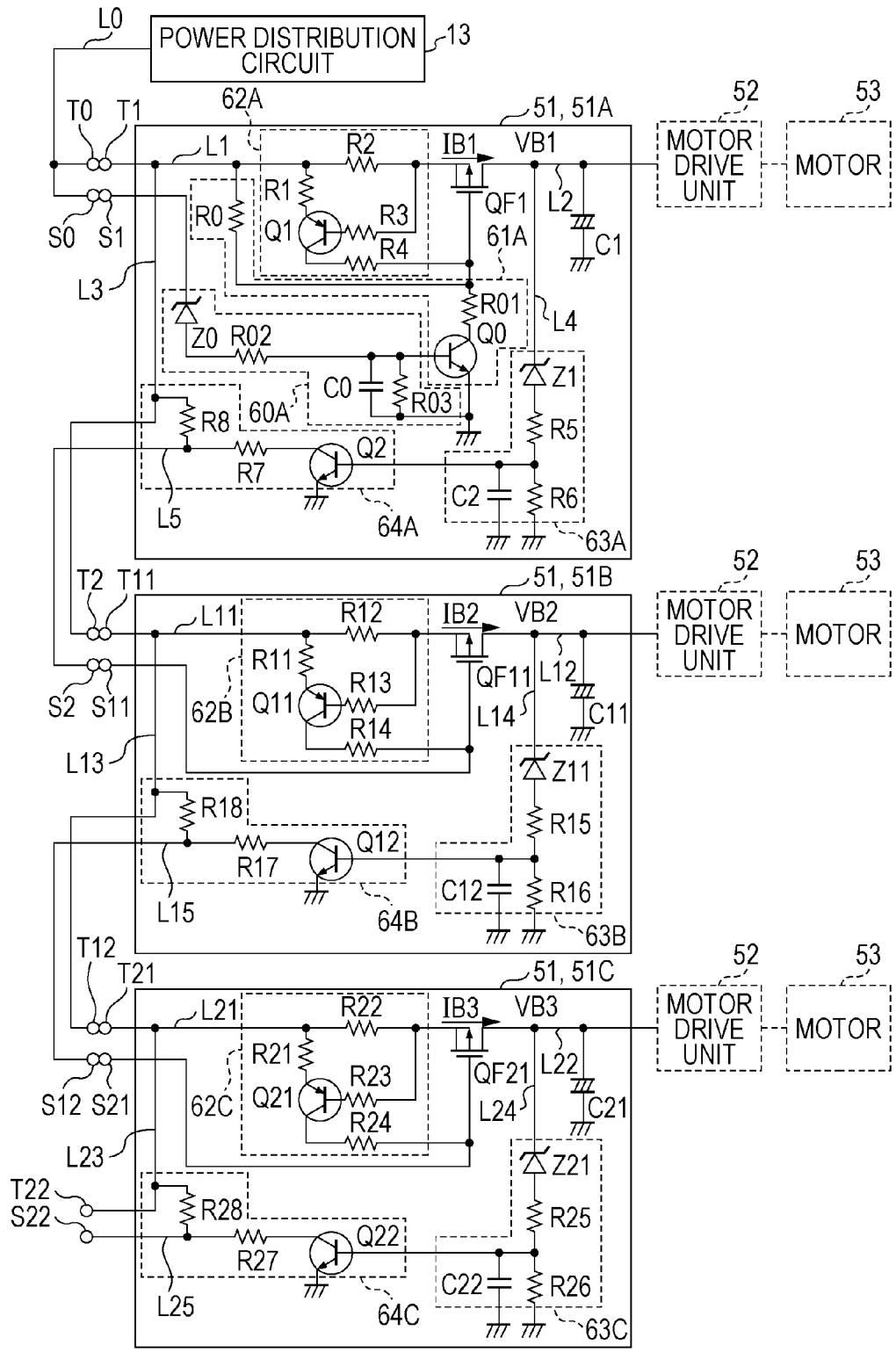
FIG. 5 is a circuit diagram according to a second embodiment.

FIG. 5 shows an example of a connection state of the respective unit-side power source control units 151 (151A, 151B, and 151C) according to the second embodiment.

As shown in FIGS. 1 and 5, all the unit-side power source control units 151 include input terminals ("T101" for the unit-side power source control unit 151A, "T111" for the unit-side power source control unit 151B, and "T121" for the unit-side power source control unit 151C; hereinafter, components will be appropriately referred to in the same manner), input terminals (S101, S111, and S121), output terminals (T102, T112, and T122), and output terminals (S102, S112, and S122). In addition, a power distribution line L100 extends from the power distribution circuit 113 in the main body portion 11, and a tip end of the power distribution line L100 branches into the output terminals T100 and S100.

If the sheet supply units 50A, 50B, and 50C are added to the main body portion 11, the input terminal T101 provided in the unit-side power source control unit 151A in the sheet supply unit 50A in the highest level is connected to the output terminal T100, and the input terminal S101 is connected to the output terminal S100.

Similarly, the input terminal T111 provided in the unit-side power source control unit 151B in the sheet supply unit 50B is connected to the output terminal T102 provided in the unit-side power source control unit 151A, and the input terminal S111 provided in the unit-side power source control unit 151B in the sheet supply unit 50B is connected to the output terminal S102 provided in the unit-side power source control unit 151A. The input terminal T121 provided in the unit-side power source control unit 151C in the sheet supply unit 50C is connected to the output terminal T112 provided in the unit-side power source control unit 151B, and the input terminal S121 provided in the unit-side power source control unit 151C in the sheet supply unit 50C is connected to the output terminal S112 provided in the unit-side power source control unit 151B.

In the unit-side power source control units 151, the input terminals (T101, T111, and T121) are connected to power supply lines (L101, L111, and L121), and the power supply lines (L101, L111, and L121) branch into power distribution lines (L103, L113, and L123). Furthermore, the power distribution lines (L103, L113, and L123) are connected to the output terminals (T102, T112, and T122). Accordingly, if the power distribution circuit 113 outputs a voltage of 42 V, for example, to the power distribution line L100, electricity is supplied to the respective unit-side power source control units 151 through a continuous route of the power distribution line L100, the output terminal T100, the input terminal T101, the power supply line L101, the power supply line L103, the output terminal T102, the input terminal T111, the power supply line L111, the power distribution line L113, the output terminal T112, the input terminal T121, the power supply line L121, . . . .

In the unit-side power source control units 151, the power supply lines (L101, L111, and L121) are connected to sources of MOSFETs (QF101, QF111, and QF121) as switches via resistors (R102, R112, and R122), and drains of the MOSFETs (QF101, QF111, and QF121) are connected to the output signal lines (L102, L112, and L122). The MOSFETs are a kind of field-effect transistor.

In addition, current restriction units (62A, 62B, and 62C) including the resistors (R102, R112, and R122) are provided between the power supply lines (L101, L111, and L121) and the MOSFETs (QF101, QF111, and QF121).

The current restriction units (62A, 62B, and 62C) include transistors (Q101, Q111, and Q121) as PNP-type bipolar transistors with emitters connected to connection points (first connection points) between the input terminals (T101, T111, and T121) of the power supply lines (L101, L111, and L121) and the resistors (R102, R112, and R122) via the resistors (R101, R111, and R121). The transistors (Q101, Q111, and Q121) have bases connected to contact points (second contact points) between the resistors (R102, R112, and R122) and the sources of the MOSFETs (QF101, QF111, and QF121) and a collector connected to gates of the MOSFETs (QF101, QF111, and QF121). The resistors (R103, R113, and R123) are provided between the bases of the transistors (Q101, Q111, and Q121) and the second contact points, and resistors (R104, R114, and R124) are provided between the collectors of the transistors (Q101, Q111, and Q121) and the gates of the MOSFETs (QF101, QF111, and QF121). The function (current restriction function) of such current restriction units (62A, 62B, and 62C) will be described later.

In the unit-side power source control unit 151, the output signal lines (L102, L112, and L122) are connected to the motor drive units 52 provided in the respective sheet supply units 50. The motor drive units 52 are circuits configured to control driving of the motors 53 for rotating the rollers 57. The motors 53 correspond to an example of the "operation unit" in the claims.

In the unit-side power source control units 151, the input terminals (S101, S111, and S121) are connected to the gates of the MOSFETs (QF101, QF111, and QF121). However, the switch drive delay unit 60A and the switch drive unit 61A are provided between the input terminal S101 and the gate of the MOSFET QF101 only in the unit-side power source control unit 151A in the sheet supply unit 50A in the highest level from among the unit-side power source control units 151 in the embodiment. The switch drive delay unit 60A and the switch drive unit 61A are circuits configured to control drive timing of the switch (MOSFET QF101) included in the unit-side power source control unit 151A as will be described later.

In the unit-side power source control units 151, the output signal lines (L102, L112, and L122) branch into signal lines (L104, L114, and L124). In addition, an end of each electrolytic capacitor (C101, C111, or C121) is connected to the output signal line (L102, L112, or L122) between a branching point to the signal line (L104, L114, or L124) and the motor drive unit 52, and the other end of each electrolytic capacitor (C101, C111, or C121) is connected to a ground terminal. The ground terminal is directly or indirectly grounded.

In the unit-side power source control units 151, the switch drive delay units (63A, 63B, and 63C) are connected to the signal lines (L104, L114, and L124), and the switch drive units (64A, 64B, and 64C) are connected to later stages of the switch drive delay units (63A, 63B, and 63C).

Furthermore, the later stages of the switch drive units (64A, 64B, and 64C) are connected to notification lines (L105, L115, and L125). The notification lines (L105, L115, and L125) are connected to the output terminals (S102, S112, and S122).

In the switch drive delay units (63A, 63B, and 63C), cathodes of Zener diodes (Z101, Z111, and Z121) are connected to a side of branching points into the output signal lines (L102, L112, and L122). In contrast, two resistances (R105 and R106, R115 and R116, or R125 and R126) are connected in series between an anode of each Zener diode (Z101, Z111, or Z121) and the ground terminal. A base of each transistor (Q102, Q112, or Q122), which is an NPN-type bipolar transistor, is connected between the two resistances (between the resistance R105 and the resistance R106, between the resistance R115 and the resistance R116, or between the resistance R125 and the resistance R126). In addition, one end of each capacitor (C102, C112, or C122) is connected between the resistance (R105, R115, or R125) and the transistor (Q102, Q112, or Q122), and the other end of each capacitor (C102, C112, or C122) is connected to the ground terminal. The switch drive delay units (63A, 63B, and 63C) are configured so as to include a part or an entirety of these Zener diodes (Z101, 2111, and Z121), the resistances (R105, R115, and R125), the resistances (R106, R116, and R126), and the capacitors (C102, C112, and C122).

In the switch drive units (64A, 64B, and 64C), the collectors of the transistors (Q102, Q112, and Q122) are connected to the notification lines (L105, L115, and L125) via the resistances (R107, R117, and R127), and the emitters thereof are connected to ground terminals. In addition, one end of each resistance (R108, R118, or R128) is connected to each notification line (L105, L115, or L125), and the other end of each resistance (R108, R118, or R128) is connected to each power distribution line (L103, L113, and L123). The switch drive units (64A, 64B, and 64C) are configured to include an entirety or a part of these transistors (Q102, Q112, and Q122), the resistances (R107, R117, and R127), and the resistances (R108, R118, and R128).

The switch drive delay unit 63A and the switch drive unit 64A provided in the unit-side power source control unit 151A are circuits configured to control driving timing of the switch (MOSFET QF111) included in the unit-side power source control unit 151B in the sheet supply unit 50B in the lower level, and corresponds to a part of the "control unit" in the claims. Similarly, the switch drive delay unit 63B and the switch drive unit 64B provided in the unit-side power source control unit 151B in the sheet supply unit 50B are circuits (a part of the control unit) configured to control the driving timing of the switch (MOSFET QF121) included in the unit-side power source control unit 151C in the sheet supply unit 50C in the lower level. Similarly, the switch drive delay unit 63C and the switch drive unit 64C provided in the unit-side power source control unit 151C in the sheet supply unit 50C are circuits (a part of the control unit) configured to control the driving timing of the switch (MOSFET) included in the unit-side power source control unit 151 in the sheet supply unit 50 in the further lower level.

In addition, the switch drive delay unit 60A and the switch drive unit 61A included in the unit-side power source control unit 151A in the sheet supply unit 50A in the highest level have the same circuit configurations as those of the switch drive delay unit 63A and the switch drive unit 64A, those of the switch drive delay unit 63B and the switch drive unit 64B, and those of the switch drive delay unit 63C and the switch drive unit 64C.

That is, in the switch drive delay unit 60A of the unit-side power source control unit 151A, the cathode of the Zener diode 2100 is connected to the input terminal S101. The anode of the Zener diode 2100 is connected to the base of the transistor Q100, which is an NPN-TYPE bipolar transistor, via a resistance R1002. In addition, an end of the capacitor C100 and an end of a resistance R1003 are respectively connected between the resistance R1002 and the base of the transistor Q100, and the other end of the capacitor C100 and the other end of the resistance R1003 are respectively connected to ground terminals. In the switch drive unit 61A of the unit-side power source control unit 151A, the collector of the transistor Q100 is connected to the gate of the MOSFET QF101 via the resistance R1001, and the emitter thereof is connected to a ground terminal. In addition, an end of the resistance R100 is connected between the resistance R1001 and the MOSFET QF101, and the other end of the resistance R100 is connected to the power supply line L101 between the input terminal T101 and the current restriction unit 62A.

Next, a description will be given of operations of the circuit shown in FIG. 5.

In the case where the electricity is distributed from the power distribution circuit 113, and the voltage input from the input terminal S101 (via the power distribution line L100 and the output terminal S100) increases to a predetermined level, breakdown of the Zener diode 2100 occurs first, and the current flows from the cathode to the side of the anode in the unit-side power source control unit 151A. In doing so, a voltage in accordance with a ratio between the resistances R1002 and R1003 is generated between the base and the emitter of the transistor Q100, and the transistor Q100 is shifted from the non-conductive (OFF) state to the conductive (ON) state. The capacitor C100 is for stabilizing the operation of shifting the transistor Q100 into the ON state and delaying the shifting timing.

If the transistor Q100 is brought into the ON state, a current flows to the transistor Q100 in a route through the resistances R100 and R1001 from the input terminal T101, a voltage in accordance with the ratio between the resistances R100 and R1001 is applied between the gate and the source of the MOSFET QF101, and the MOSFET QF101 is shifted from the OFF state to the ON state. That is, after the input terminals S101 and T101 input the voltage from the power distribution circuit 113, the MOSFET QF101 is driven (brought into the ON state) with some delay by the functions of the switch drive delay unit 60A and the switch drive unit 61A.

As a result, a current (inrush current IB101) passes from the input terminal T101 through the resistance R102 and between the source and the drain of the MOSFET QF101 and flows to the output signal line L102, and a voltage VB101 is generated in the output signal line L102. Electrical charge is accumulated in the electrolytic capacitor C101 due to the inrush current IB101, and if the electrolytic capacitor C101 is fully charged, the inrush current IB101 disappears. Thereafter, the voltage VB101 is stably applied to the motor drive unit 52 to which the output signal line L102 is connected, and the motor drive unit 52 controls the motor 53 by using the applied voltage.

A description will be given of the current restriction function of the current restriction units (62A, 62B, and 62C). Here, a description will be given of the case of the current restriction unit 62A in the unit-side power source control unit 151A. However, the other current restriction units 62B and 62C also exhibit the same current restriction function. If the MOSFET QF101 in the unit-side power source control unit 151A conducts as described above, a voltage is generated in the resistance R102 due to the current flowing through the power supply line L101. In doing so, a voltage is generated between the base and the emitter of the transistor Q101, and the transistor Q101 is shifted to the ON state. If the transistor Q101 is turned on, a current flows in a route from the input terminal T101 through the resistance R101, the transistor Q101, and the resistance R104, and the amount of current flowing through the resistance R102 decreases in accordance with an increase in the current. If the amount of current flowing through the resistance R102 decreases, the transistor Q101 returns to the OFF state. Hereinafter, the current passing through the resistance R102 and flowing into the MOSFET QF101 is restricted (equilibrated) to a specific level or lower by the transistor Q101 repeatedly being in the ON state and the OFF state.

The voltage VB101 is also applied to the switch drive delay unit 63A in the unit-side power source control unit 151A via the signal line L104. That is, if the voltage VB101 increases to the predetermined level, breakdown of the Zener diode 2101 occurs. In doing so, a voltage in accordance with the ratio between the resistances R105 and R106 is generated between the base and the emitter of the transistor Q102, and the transistor Q102 is shifted from the OFF state to the ON state. The capacitor C102 is for stabilizing the operation of shifting the transistor Q102 to the ON state and delaying the shifting timing in the same manner as the function of the capacitor C100. If the transistor Q102 is brought into the ON state, a current flows to the transistor Q102 in a route from the input terminal T101 through the power distribution line L103 and the resistances R108 and R107, and a voltage in accordance with the ratio between the resistances R108 and R107 is generated in the notification line L105.

The voltage generated in the notification line L105 as described above corresponds to power supply permission (a signal which behaves as power supply permission; hereinafter, also referred to as a notification signal) for the sheet supply unit 50B in the lower level. The notification signal is applied to the gate of the MOSFET QF111 in the unit-side power source control unit 151B via the notification line L105, the output terminal S102, and the input terminal S111. As a result, the MOSFET QF111 is shifted from the OFF state to the ON state due to a potential difference (a difference between the voltage (42 V) input by the input terminal T111 and the voltage of the notification signal input by the input terminal S111) between the gate and the source. Thereafter, the same operations as the operations after the MOSFET QF101 in the unit-side power source control unit 151A is brought into the ON state occur in turn.

That is, if the MOSFET QF111 is brought into the ON state, a current (inrush current IB102) passes from the input terminal T111 through the resistance R112 and the MOSFET QF111 and flows to the output signal line L112, and a voltage VB102 is generated in the output signal line L112 in the unit-side power source control unit 151B. Electrical charge is accumulated in the electrolytic capacitor C111 due to the inrush current IB102, and if the electrolytic capacitor C111 is fully charged, the inrush current IB102 disappears. Thereafter, the voltage VB102 is stably applied to the motor drive unit 52 to which the output signal line L112 is connected. The voltage VB102 is also applied to the switch drive delay unit 63B in the unit-side power source control unit 151B via the signal line L114. If the voltage VB102 rises to a predetermined level, breakdown of the Zener diode 2111 occurs. If the transistor Q112 is brought into the ON state with some delay after the breakdown, a notification signal to the sheet supply unit 50C in the lower level is generated in the notification line L115. By applying the notification signal to the gate of the MOSFET QF121 in the unit-side power source control unit 151C via the notification line L115, the output terminal S112, and the input terminal S121, the MOSFET QF121 is shifted from the OFF state to the ON state.

If the MOSFET QF121 is brought into the ON state, a current (inrush current IB103) passes from the input terminal T121 through the resistance R122 and the MOSFET QF121 and flows to the output signal line L122, and a voltage VB103 is generated in the output signal line L122 in the unit-side power source control unit 151C. Electrical charge is accumulated in the electrolytic capacitor C121 due to the inrush current IB103, and if the electrolytic capacitor C121 is fully charged, the inrush current IB103 disappears. Thereafter, the voltage VB103 is stably applied to the motor drive unit 52 to which the output signal line L122 is connected. If another unit-side power source control unit 151 is further connected to the lower level below the unit-side power source control unit 151C, the same operations as those described above occur in turn.

According to the above description of FIG. 5, each of the input terminals (T101, T111, and T121) corresponds to the power supply unit configured to receive electricity supplied from the main body portion 11 or the sheet supply unit 50 in the higher level, and each of the output terminals (T102, T112, and T122) corresponds to the power distribution unit which distributes the electricity to the sheet supply unit 50 in the lower level. In addition, each of the input terminals (S101, S111, and S121) corresponds to the receiving unit which receives the power supply permission (the voltage output from the power distribution circuit 113 to the power distribution line L100 or the voltage (notification signal) generated in the notification lines L105, L115, . . . ) from the main body portion 11 or the sheet supply unit 50 in the higher level, and each of the output terminals (S102, S112, and S122) corresponds to the notification unit which provides the notification of the power supply permission to the receiving unit of the sheet supply unit 50 in the lower level.

In addition, it is possible to state that the unit-side power source control unit 151 functions as the control unit configured to cause the power supply units (input terminals T101, T111, and T121) to start the power supply when the receiving units (input terminals S101, S111, and S121) receive the power supply permission and cause the notification units (output terminals S102, S112, and S122) to provide notification of the power supply permission when the voltage (VB101, VB102, and VB103) of the supplied electricity exceeds the predetermined threshold value. The threshold value described herein indicates a level of the voltage (VB101, VB102, and VB103), which is required to turn on the transistors (Q102, Q112, and Q122), for example. In addition, the MOSFETs (QF101, QF111, and QF121) starts the power supply from the power supply units (input terminals T101, T111, and T121) to the side of the motor 53 in response to the reception of the power supply permission by the receiving units (input terminals S101, S111, and S121).

With the configuration shown in FIG. 5, the same result as that described with reference to FIGS. 3A to 3E is achieved. A specific description will be given of the result of employing the configuration shown in FIG. 5 with reference to FIGS. 3A to 3E. FIG. 3A shows variations in voltage with respect to time, and shows the voltage (42 V, for example) output from the power distribution circuit 113 to the power distribution line L100 and the voltage VB101, VB102, and VB103 output from the unit-side power source control units 151A, 151B, and 151C, respectively. In addition, all FIGS. 3B, 3C, 3D, and 3E show variations in current with respect to time. FIG. 3B shows the inrush current IB101 which flows when the MOSFET QF101 in the unit-side power source control unit 151A is turned on. FIG. 3C shows the inrush current IB102 which flows when the MOSFET QF111 in the unit-side power source control unit 151B is turned on. FIG. 3D shows the inrush current IB103 which flows when the MOSFET QF121 in the unit-side power source control unit 151C is turned on. FIG. 3E shows variations in the current I42 which is made to flow by the power distribution circuit 113 to the power distribution line L100. Such an inrush current occurs in a case in which power supply to the main body portion 11 is started while the plurality of sheet supply units 50 are mounted on the main body portion 11 and a case in which the plurality of sheet supply units 50 are connected to the main body portion 11, to which the power supply has been started, at the same time (the sheet supply units 50 are connected in a state in which the power distribution circuit 113 performs power distribution from the power distribution line L100; this is also called live insertion), for example.

According to the embodiment, the inrush current (IB102) in a specific unit-side power source control unit 151 (the unit-side power source control unit 151B, for example) does not occur until the switch (QF111) is shifted to the ON state by the voltage (VB101), which is output from the unit-side power source control unit 151 (the unit-side power source control unit 151A) in the higher level, exceeding the predetermined value after the inrush current (IB101) is generated in the unit-side power source control unit 151 (the unit-side power source control unit 151A) in the higher level above the unit-side power source control unit 151, as can be understood from the description of FIG. 5 and FIGS. 3A to 3E. For this reason, the inrush current generation timing in each sheet supply unit 50 (unit-side power source control unit 151) deviates. Therefore, a peak value of the current I42 that the power distribution circuit 113 in the main body portion 11 makes to flow does not become a value which is as excessively large as a sum of the inrush current in the plurality of sheet supply units 50 and always becomes a value which is suppressed to be equal to or less than a specific value (equal to or less than a peak value of the inrush current which occurs in a single unit-side power source control unit 151), and the burden on the main body portion 11 decreases.

According to the embodiment, the sheet supply units 50 other than the sheet supply unit 50A in the highest level, which includes the switch drive delay unit 60A and the switch drive unit 61A, have completely the same configuration. Therefore, the same effect as that described with reference to FIGS. 3A to 3E is achieved merely by mounting the sheet supply unit 50A in the highest level, which includes the switch drive delay unit 60A and the switch drive unit 61A, and a number desired by the user of sheet supply units 50 in the lower levels with the same configuration, on the main body portion 11. That is, it is possible to reliably cause the inrush current occurrence timing to deviate without requiring complicated design or operations such as an operation of differentiating setting of a time constant for each optional unit as disclosed in JP-A-2006-19986.

In the timing generation circuit disclosed in JP-A-2006-19986, a difference between an originally intended response speed and an actual response speed deviates for each timing generation circuit due to temporal degradation of the capacitors, variations in environmental temperature, and the like. For this reason, there is a need to provide a margin in order to be able to absorb the variations in the respective timing generation circuits (a difference in response speed between the timing generation circuits) in a stage of design in order to reliably secure the difference between the response speeds of the respective timing generation circuits, and as a result, it takes a long time to activate the plurality of optional units. However, since the switch in the optional unit in the lower level, which allows conduction, is controlled by the power supply permission (notification signal) generated in accordance with an increase in voltage generated by the switch in the optional unit in the higher level allowing conduction in the embodiment, the timing of the switches allowing conduction reliably deviates between the optional units regardless of degradation of the capacitors and the like. Accordingly, an increase in time required for the plurality of optional units to be activated as in JP-A-2006-19986 does not occur.

According to the configuration of the current restriction units (62A, 62B, and 62C), the resistances are provided on all the routes between the input terminals (T101, T111, and T121) and the switches (MOSFETs QF101, QF111, and QF121) as can be understood from FIG. 5. A so-called parasitic capacitance is present in a switch element such as a MOSFET. In a case of live insertion of the sheet supply units 50 into the main body portion 11, in particular, a kind of inrush current called a spike wave or the like instantaneously flows into such a parasitic capacitance and may cause certain failures. Since the resistances are provided on all the routes between the input terminals (T101, T111, and T121) and the switches (MOSFETs QF101, QF111, and QF121) in the embodiment, it is possible to reliably restrict the inrush current flowing to the parasitic capacitance.

The invention is not limited to the aforementioned embodiments, and can be implemented in various configurations without departing from the gist thereof. For example, it is possible to employ other configurations as will be described below. Configurations as combinations of the configurations are also within the scope of the invention. In relation to other configurations described below, points that are different from those in the embodiment will be described.

Another Configuration 1

Figure 6:
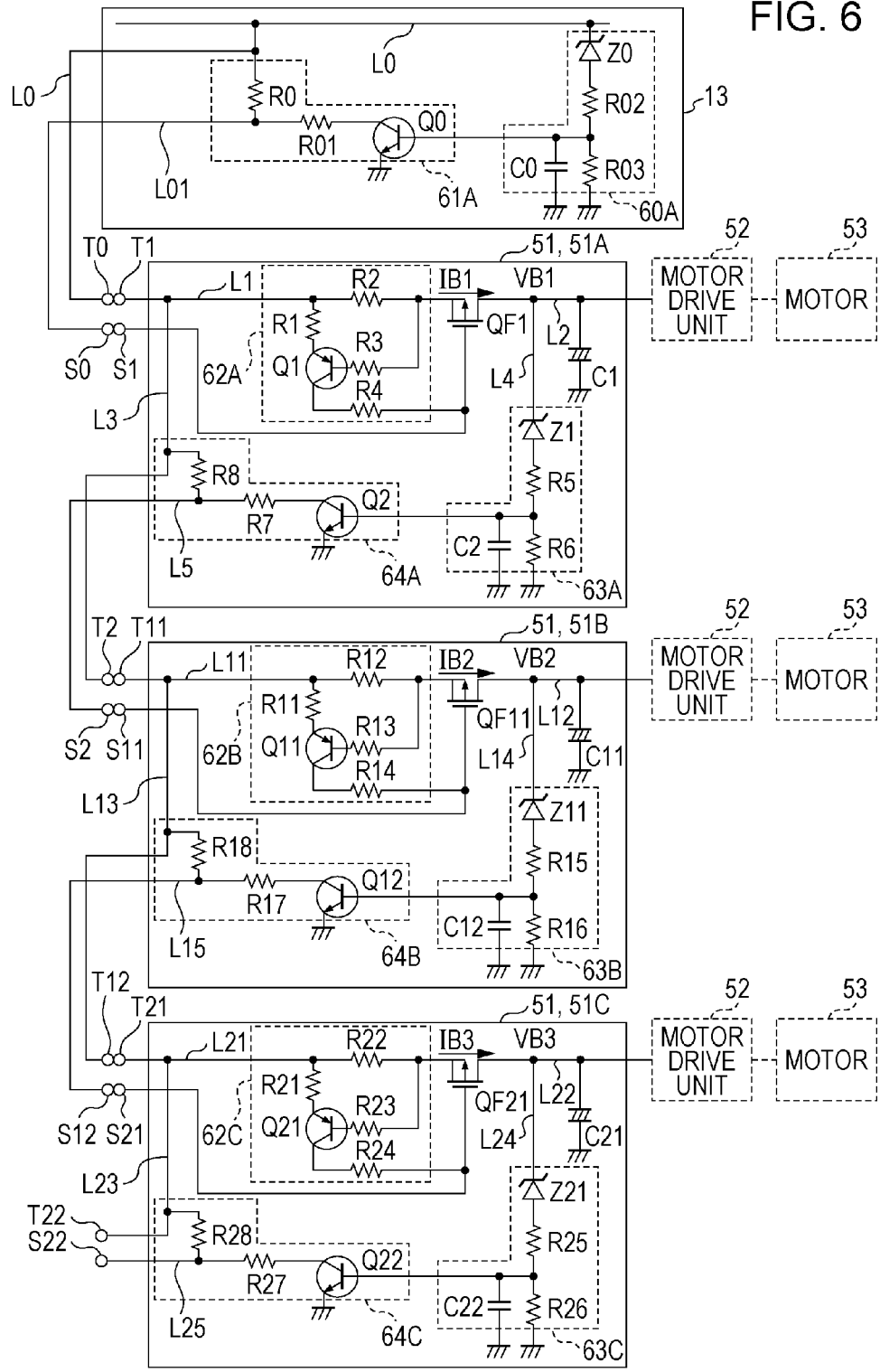
FIG. 6 is a circuit diagram showing, as an example, another configuration 1.

FIG. 6 shows an example of a connection state between the power distribution circuit 113 and the respective unit-side power source control units 151 in another configuration 1. FIG. 6 is different from FIG. 5 (second embodiment) in that the switch drive delay unit 60A and the switch drive unit 61A are provided in the power distribution circuit 113 instead of the unit-side power source control unit 151A in the sheet supply unit 50A in the highest level. Although a positional relationship between the capacitor C100 and the resistance R1003 in the switch drive delay unit 60A in FIG. 5 is slightly different from that in the switch drive delay unit 60A in FIG. 6, it is possible to consider that the switch drive delay unit 60A in FIG. 6 has the same circuit function as that of the switch drive delay unit 60A in FIG. 5.

In FIG. 6, the output terminal T100 from the power distribution circuit 113 is connected to the power distribution line L100 which outputs the voltage of 42 V while the output terminal S100 from the power distribution circuit 113 is connected to a notification line L1001. The notification line L1001 is a signal line connected between the resistance R100 and the resistance R1001 in the switch drive unit 61A inside the power distribution circuit 113. In the unit-side power source control unit 151A, the input terminal S101 is directly connected to the gate of the MOSFET QF101. Inside the power distribution circuit 113, the cathode of the Zener diode 2100 of the switch drive delay unit 60A and the resistance R100 of the switch drive unit 61A are connected to the power distribution line L100 which outputs the voltage of 42 V. Accordingly, the configuration shown in FIG. 6 has the same function as that of the configuration shown in FIG. 5. According to the second embodiment, all the sheet supply units 50 including the sheet supply unit 50A in the highest level have the same configuration.

Therefore, the effect as described with reference to FIGS. 3A to 3E can be achieved merely by mounting a number desired by the user of sheet supply units 50 with the same configuration on the main body portion 11.

Another Configuration 2

Figure 7:
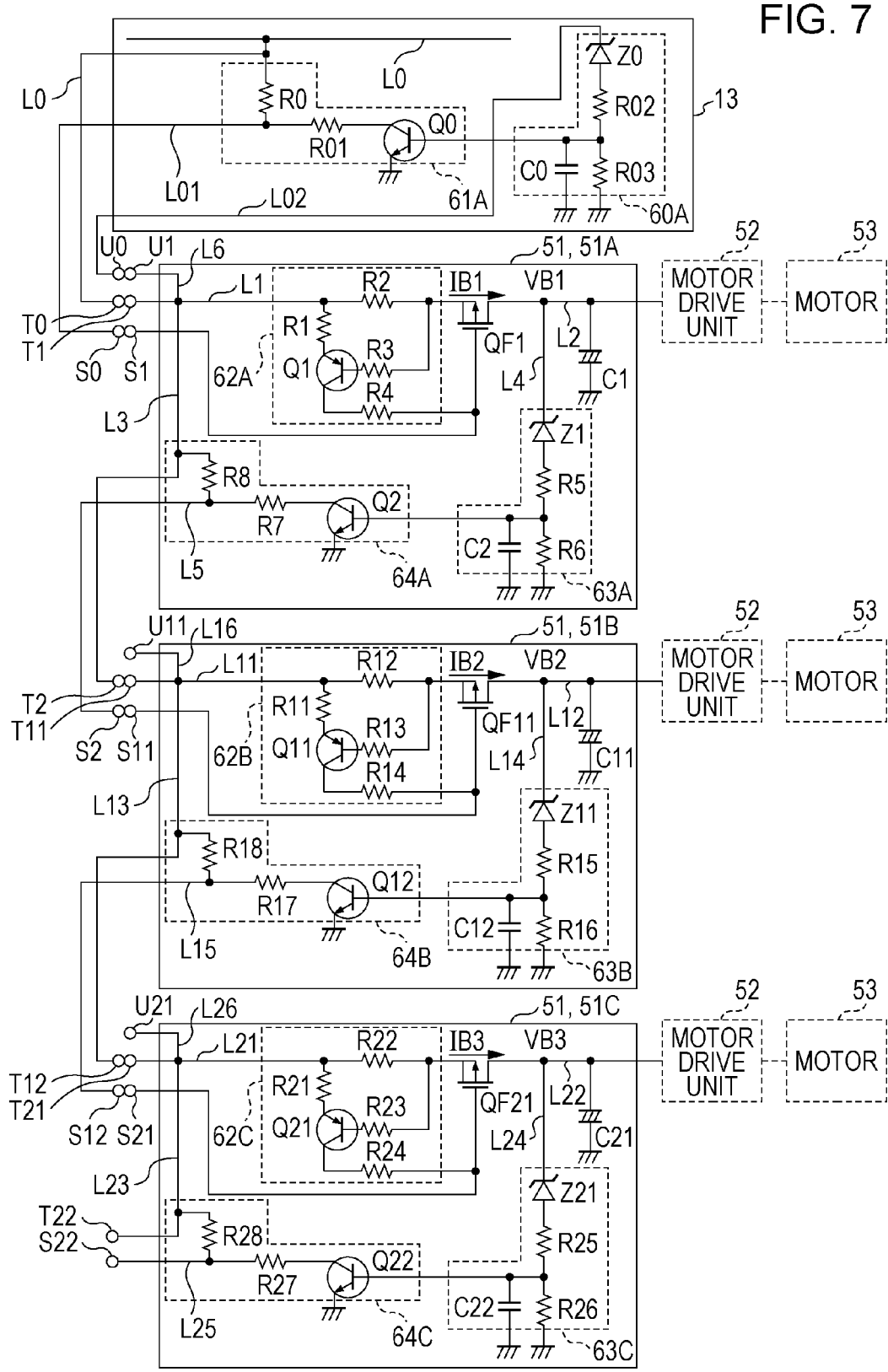
FIG. 7 is a circuit diagram showing, as an example, another configuration 2.

FIG. 7 shows an example of a connection state between the power distribution circuit 113 and the respective unit-side power source control units 151 in another configuration 2. FIG. 7 is different from FIG. 6 (another configuration 1) in that the respective unit-side power source control units 151 (151A, 151B, and 151C) include connection detecting lines (L106, L16, and L126) and output terminals (U1, U11, and U21) at tip ends of the connection detecting lines (L106, L16, and L126) and the power distribution circuit 113 includes a connection detecting line L1002 and an input terminal U0 at a tip end of the connection detecting line L1002. The connection detecting lines (L106, L16, and L126) branch from the power supply lines (L101, L111, and L121).

In FIG. 7, the switch drive delay unit 60A is not connected to the power distribution line L100 which outputs the voltage of 42 V and is connected to the connection detecting line L1002 in the power distribution circuit 113. When the power distribution circuit 113 is connected to the unit-side power source control unit 151A in the sheet supply unit 50A in the highest level, the input terminal U0 and the output terminal U1 of the unit-side power source control unit 151A are connected. That is, the voltage is applied to the cathode of the Zener diode 2100 of the switch drive delay unit 60A via the power supply line L101, the connection detecting line L106, the output terminal U1, the input terminal U0, and the connection detecting line L1002. With such a configuration, the switch drive delay unit 60A and the switch drive unit 61A in the power distribution circuit 113 do not operate as long as the power distribution circuit 113 is not connected to the unit-side power source control unit 151A in the highest level.

Therefore, it is possible to state that the configuration shown in FIG. 7 is more excellent than the configuration shown in FIG. 6 in terms of countermeasures for the case of the live insertion. That is, according to the configuration shown in FIG. 7, even in the case of the live insertion of a series of a plurality of sheet supply units 50 into the main body portion 11, the switch drive delay unit 60A and the switch drive unit 61A in the power distribution circuit 113 start operations, and the MOSFET QF101 in the unit-side power source control unit 151A is shifted from the OFF state to the ON state after the live insertion. For this reason, it is possible to avoid a situation in which the voltage VB101 steeply rises in the unit-side power source control unit 151A at substantially the same time with the live insertion, to shift the MOSFET QF101 from the OFF state to the ON state with some delay after the live insertion, and to gradually increase the voltage VB101 as shown in the example in FIGS. 3A to 3E. According to another configuration 2, all the sheet supply units 50 including the sheet supply unit 50A in the highest level have the same configuration. Therefore, the effect as described above with reference to FIGS. 3A to 3E can be achieved merely by mounting a number desired by the user of sheet supply units 50 with the same configuration on the main body portion 11.

Another Configuration 3

Figure 8:
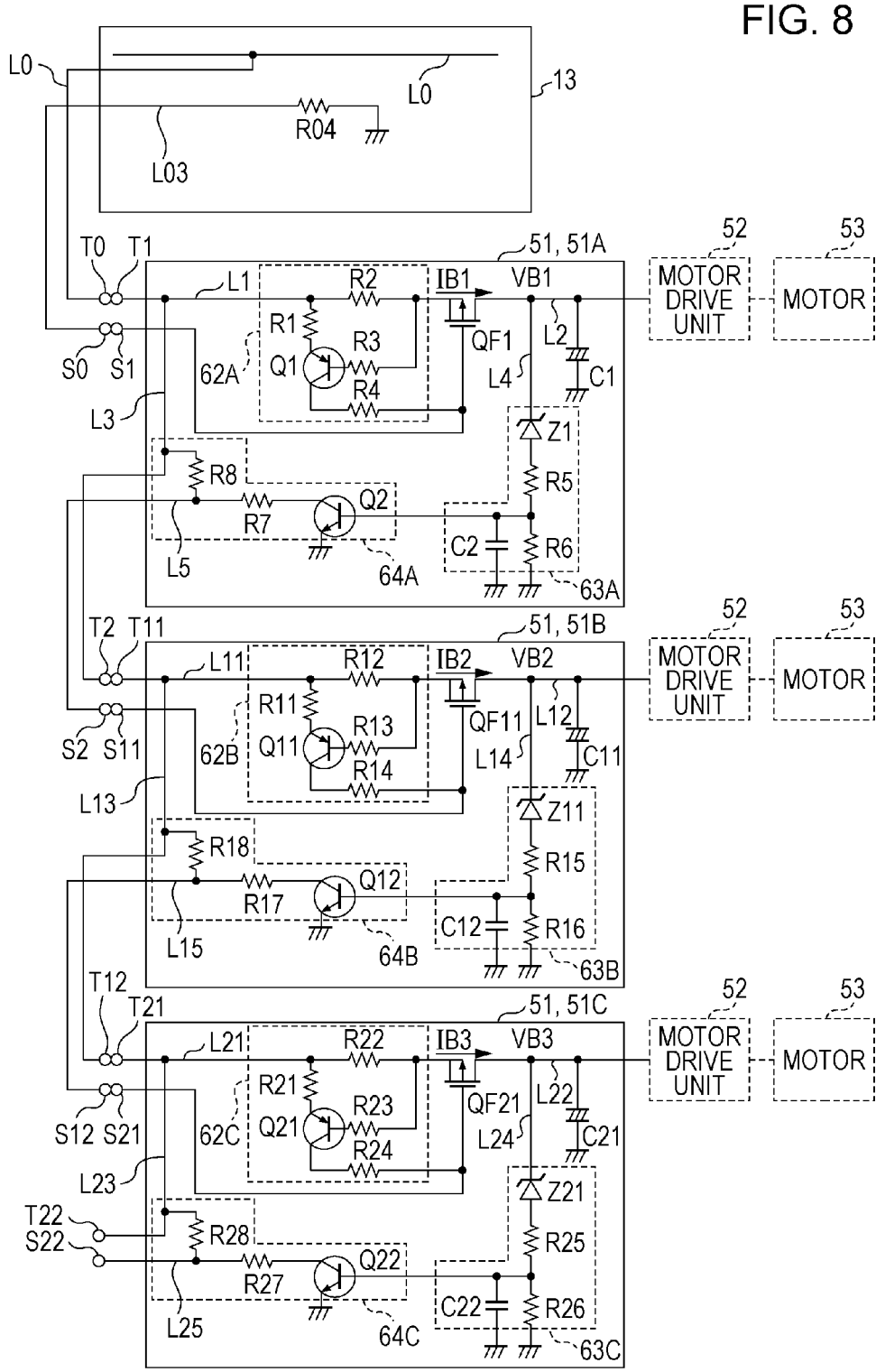
FIG. 8 is a circuit diagram showing, as an example, another configuration 3.

FIG. 8 shows an example of a connection state between the power distribution circuit 113 and the respective unit-side power source control units 151 according to another configuration 3. FIG. 8 is different from FIG. 6 (another configuration 2) in that the switch drive delay unit 60A and the switch drive unit 61A are not present. In addition, the terminal S100 from the power distribution circuit 113 is connected only to the ground terminal via a signal line L1003 and a resistance R1004 in the power distribution circuit 113. With such a configuration, the MOSFET QF101 is shifted from the OFF state to the ON state by the potential difference between the gate and the source (the potential difference between the input terminal T101 and the input terminal S101). If execution of the live insertion by the user as described above is not assumed and it is not necessary to delay the rising of the voltage VB101 in the unit-side power source control unit 151A in the highest level with respect to the timing at which the supply of 42V by the power distribution line L100 is started (at least, it is only necessary that the rising of the voltage VB102 delays as compared with the voltage VB101, and that the rising of the voltage VB103 delays as compared with the voltage VB102), it is possible to employ a simple configuration as shown in FIG. 8. According to another configuration 3, it is possible to simplify and downsize the configuration of the main body portion 11 (power distribution circuit 113). In addition, all the sheet supply units 50 including the sheet supply unit 50A in the highest level have the same configuration.

Another Configuration 4

Figure 9:
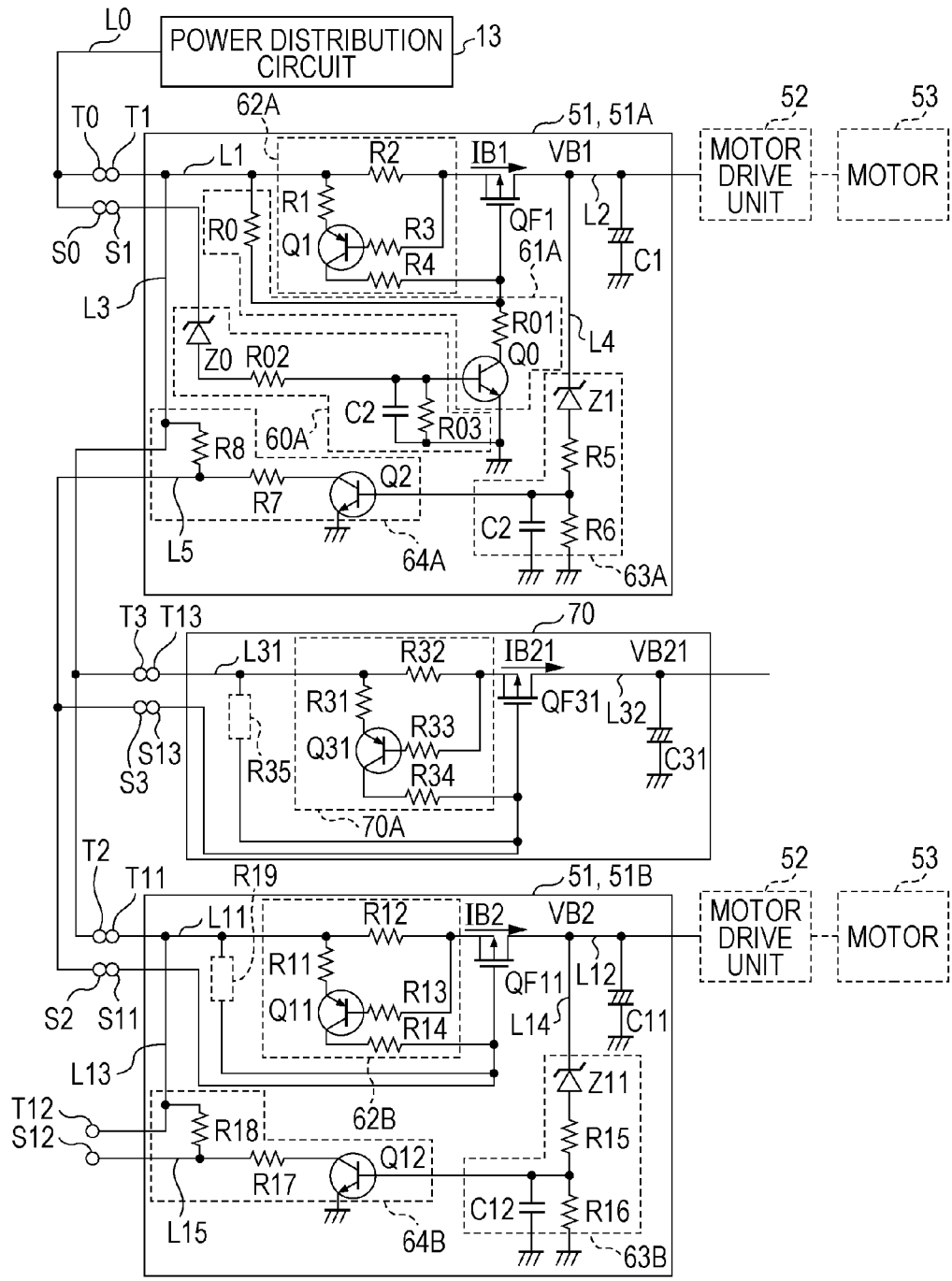
FIG. 9 is a circuit diagram showing, as an example, another configuration 4.

FIG. 9 shows an example of a connection state and the like between the power distribution circuit 113 and the respective unit-side power source control units 151 according to another configuration 4. FIG. 9 is different from FIG. 5 (second embodiment) in that the unit-side power source control unit 70 is connected in parallel with the unit-side power source control unit 151B on the lower level side of the unit-side power source control unit 151A. In FIG. 9, depiction of the unit-side power source control unit 151C connected in a lower level below the unit-side power source control unit 151B is omitted. The unit-side power source control unit 70 is a power source control circuit included in an optional unit (second option nit) that the user can arbitrarily add to the sheet supply unit 50A. The second optional unit is a device for expanding the function of the sheet supply unit as a connection target and is connected to a connector, such as a universal serial bus (USB) port, included in the sheet supply unit as the connection target. No more optional unit is connected to the later stage of the second optional unit.

In FIG. 9, the power distribution line L103 in the unit-side power source control unit 151A branches into the output terminal T102 and an output terminal T3. In addition, the notification line L105 in the unit-side power source control unit 151A branches into the output terminal S102 and an output terminal S3. When the second optional unit, which is not shown in the drawing, is add to the sheet supply unit 50A, an input terminal T13 provided in the unit-side power source control unit 70 is connected to the output terminal T3, and an input terminal S13 provided in the unit-side power source control unit 70 is connected to the output terminal S3.

The unit-side power source control unit 70 has a simpler configuration, in which the aforementioned functions corresponding to the switch drive delay unit and the switch drive unit and a function of connecting to the optional unit in a later stage are not provided, than the configurations of the unit-side power source control units 151A, 151B, and 151C. That is, in the unit-side power source control unit 70, the input terminal T13 is connected to a power supply line L31, and the power supply line L31 is connected to a source and a gate of a MOSFET QF31 as a switch via a current restriction unit 70A (the current restriction unit 70A including resistances R31, R32, R33, and R34 and a PNP-type bipolar transistor Q31) with the same configuration as that of the current restriction units (62A, 62B, and 62C) described above. A drain of the MOSFET QF31 is connected to an output signal line L32. In the unit-side power source control unit 70, the output signal line L32 is connected to an operation unit (a motor or the like) included in the second optional unit. One end of an electrolytic capacitor C31 is connected to the output signal line L32, and the other end of the electrolytic capacitor C31 is connected to a ground terminal. In the unit-side power source control unit 70, the input terminal S13 is connected to the gate of the MOSFET QF31.

The MOSFET QF31 is shifted from the OFF state to the ON state due to a potential difference between the gate and the source (a potential difference between the input terminal T13 and the input terminal S13). If the MOSFET QF31 is brought into the ON state, a current (inrush current IB21) passes from the input terminal T13 through the resistance R32 and the MOSFET QF31 and flows to the output signal line L32, and a voltage VB21 is generated in the output signal line L32. Electrical charge is accumulated in the electrolytic capacitor C31 due to the inrush current IB21, and if the electrolytic capacitor C31 is fully charged, the inrush current IB21 disappears. Thereafter, the voltage VB21 is stably applied to the operation unit, which is included in the second optional unit, and to which the output signal line L32 is connected.

According to another configuration 4 as described above, the unit-side power source control unit 151A (the switch drive delay unit 63A and the switch drive unit 64A) in the sheet supply unit 50A is a circuit configured to control driving timing of the switch (MOSFET QF111) included in the unit-side power source control unit 151B in the sheet supply unit 50B in the lower level and also functions as a circuit configured to control driving timing of the switch (MOSFET QF31) included in the unit-side power source control unit 70 in the second optional unit. According to another configuration 4, the resistance R108 may not be provided in the switch drive unit 64A in the unit-side power source control unit 151A, and instead, a resistance R35 (not shown) may be provided between the power supply line L31 and the gate of the MOSFET QF31 in the unit-side power source control unit 70, and a resistance R19 (not shown) may be provided between the power supply line L111 and the gate of the MOSFET QF111 in the unit-side power source control unit 151B.

The resistances R35 and R19 are respectively in charge of the function of the resistance R108 (voltage dividing in accordance with a ratio relative to the resistance R107), and values of the resistances R35 and R19 are differentiated here. With such a configuration, it is possible to cause timing, at which the respective switches (MOSFETs QF111 and QF31) are turned on, to deviate in the relationship between the unit-side power source control unit 151B and the unit-side power source control unit 70 which commonly use the control unit included in the optional unit in the higher level for generating the notification signal to be input, and as a result, it is possible to cause the generation timing of the inrush current IB102 and IB21 to deviate from each other. According to another configuration 4, it is possible to achieve a decrease in size of the configuration of the unit-side power source control unit 70 in the second optional unit by commonly using the control unit. It is a matter of course that another configuration 1, another configuration 2, and another configuration 3 can be applied to the configurations of the power distribution circuit 113 and the unit-side power source control unit 151 according to another configuration 4.

Modification Example

The present invention is not limited to the aforementioned embodiments and can be implemented in various configurations without departing from the gist thereof.

In the aforementioned embodiments, the "connection" between components shown in the respective drawings represents only electrical connection between the components. Therefore, other configurations which are not shown in the drawing may be interposed between the components, or physical connection (wired connection) may be cut, as long as the electrical connection between the components is available. In addition, the power supply permission provided to the sheet supply unit 50 in the lower level as described above may be provided in such a manner that a signal which has been present is discontinued (or a level of the signal is lowered) instead of generating the signal (notification signal), and may be provided in any form as long as the power supply permission functions as a factor causing the switch in the sheet supply unit 50 in the lower level to allow conduction as a result.

In a case in which the optional unit is understood as the sheet supply unit 50 as described above, the invention can be applied to any product as long as the sheet supply unit 50 can be added thereto. That is, the product to which the invention is applied may be a product, such as a printer, which requires sheet supply and is not a facsimile apparatus or the multi-function machine.

In addition, the main body portion 11 can be referred to as a power supply apparatus in terms of the function of supplying electricity for driving the respective optional units. The system including such a power supply apparatus and such optional units may be implemented as an independent product such as a facsimile apparatus, a multifunction machine, or a printer, or may be constructed across a plurality of products or apparatuses.

In addition, the optional units are not limited to the sheet supply units. That is, the relationship between the sheet supply apparatus and the optional units, which is proposed by the invention, is widely applied to relationships between a side (master) of controlling a system which is constructed in a specific scene for performing power supply and communication and a side (slave) of being connected to and controlled by the system. For example, a plurality of batteries (cells) to be mounted on an electrical vehicle is assumed. An in-vehicle controller configured to control operations of the batteries corresponds to the power supply apparatus proposed by the invention, and the respective batteries controlled by the controller correspond to the optional units proposed by the invention. Alternatively, a PC and additional devices that a user arbitrarily adds to the PC are assumed. The PC corresponds to the power supply apparatus proposed by the invention, and the additional devices correspond to the optional units proposed by the invention.

From such a wide viewpoint of not limiting the invention to a product on which sheet supply units are mounted, it is possible to state that the second embodiment discloses a configuration of an optional unit configured to be connected to a power supply apparatus, the operation unit including: a power supply unit configured to receive electricity supplied from the power supply unit or an optional unit in a higher level; a power distribution unit configured to distribute the electricity to an optional unit in a lower level; an operation unit configured to operate with the electricity supplied by the power supply unit; a notification unit configured to provide notification of power supply permission to a receiving unit of the optional unit in the lower level; a receiving unit configured to receive the power supply permission from the power supply apparatus or the notification unit of the optional unit in the higher level; and a control unit configured to cause the power supply unit to start the power supply in response to the reception of the power supply permission by the receiving unit and cause the notification unit to provide the notification of the power supply permission in accordance with a voltage of the supplied electricity exceeding a predetermined threshold value.

Furthermore, it is possible to state that the second embodiment discloses a configuration of a control system of optional units, which is provided with a power supply apparatus and the optional units connected to the power supply apparatus, the power supply apparatus including a first power distribution unit (output terminal T100) configured to distribute electricity to an optional unit in the highest connection level and a first notification unit (output terminal S100) configured to provide notification of power supply permission to the optional unit in the highest level, each of the optional units including a power supply unit (input terminal T101, T111, or T121) configured to receive electricity supplied from the power supply apparatus or an optional unit in a higher level, a second power distribution unit (output terminal T102, T112, or T122) configured to distribute the electricity to an optional unit in a lower level, an operation unit configured to operate with the electricity supplied by the power supply unit, a second notification unit (output terminal S102, S112, or S122) configured to provide a notification of power supply permission to the receiving unit of the optional unit in the lower level, a receiving unit (input terminal S101, S111, or S121) configured to receive the power supply permission from the power supply apparatus or the optional unit in the higher level, and a control unit configured to cause the power supply unit to start the power supply in response to the reception of the power supply permission by the receiving unit and cause the second notification unit to provide the notification of the power supply permission in accordance with a voltage of the supplied electricity exceeding a predetermined threshold value.

In addition, a part or an entirety of wiring between the power supply apparatus and the optional units or between the optional units may be replaced with wireless connection. Although the type of the wireless connection is arbitrarily selected, the supply of the voltage may be replaced with wireless power supply based on an electromagnetic induction scheme, or the notification signal may be sent in the wireless manner by using light with light intensity in accordance with a voltage.

3. Third Embodiment

On the assumption of the configuration shown in FIG. 1, a description will be given of a third embodiment for delaying (causing deviation in) inrush current generation timing at each optional unit.

As described above, the basic configuration of the facsimile apparatus 10 is the same as that described in the first embodiment (FIG. 1). However, in the third embodiment, unit-side power source control units 251 (251A, 251B, and 251C) are provided instead of the unit-side power source control units 51 (51A, 51B, and 51C) in the first embodiment, and a power distribution circuit 213 is provided instead of the power distribution circuit 13.

Figure 10:
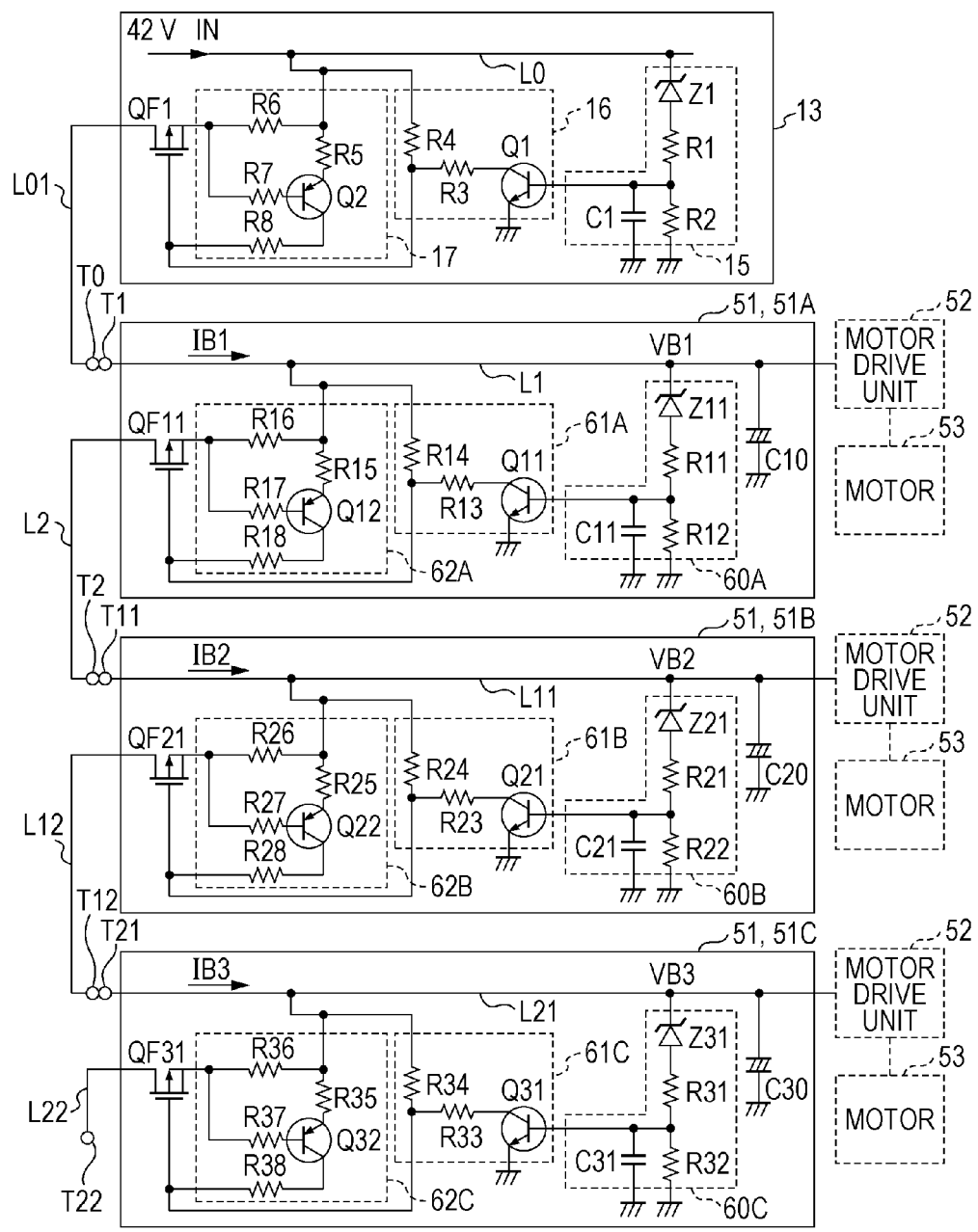
FIG. 10 is a circuit diagram according to a third embodiment.

FIG. 10 shows an example of a connection state between the power distribution circuit 213 and the respective unit-side power source control units 251 (251A, 251B, and 251C) according to the third embodiment.

As shown in FIGS. 1 and 10, a power distribution line L200 from which a voltage of 42 V, for example, is output is provided in the power distribution circuit 213. In addition, a power distribution line L2001 for distributing electricity to optional units additionally provided extends from the power distribution circuit 213, and a tip end of the power distribution line L2001 corresponds to an output terminal T200.

All the unit-side power source control units 251 include input terminals ("T201" for the unit-side power source control unit 251A, "T211" for the unit-side power source control unit 251B, and "T221" for the unit-side power source control unit 251C; hereinafter, components will be appropriately referred to in the same manner) and output terminals (T202, T212, and T222). When the sheet supply units 50A, 50B, and 50C are added to the main body portion 11 as shown in FIG. 1, the input terminal T201 provided in the unit-side power source control unit 251A of the sheet supply unit 50A in the highest level is connected to the output terminal T200 of the power distribution circuit 213. Similarly, the input terminal T211 provided in the unit-side power source control unit 251B of the sheet supply unit 50B is connected to the output terminal T202 provided in the unit-side power source control unit 251A. The input terminal T221 provided in the unit-side power source control unit 251C of the sheet supply unit 50C is connected to the output terminal T212 provided in the unit-side power source control unit 251B.

In the unit-side power source control units 251, the input terminals (T201, T211, and T221) are connected to the power supply lines (L201, L211, and L221), and the power supply lines (L201, L211, and L221) are connected to the motor drive unit 52 provided at each sheet supply unit 50 outside each unit-side power source control unit 251. The motor drive unit 52 is a circuit configured to control driving of the motor 53 for rotating the roller 57. The motor 53 corresponds to an example of the "operation unit" in the claims. In addition, the output terminals (T202, T212, and T222) are connected to power distribution lines (L202, L212, and L222). In a case in which the power distribution circuit 213 outputs the voltage of 42 V to the power distribution line L200, electricity is supplied to the respective unit-side power source control units 251 in a route through the power distribution line L200, the power distribution line L2001, the output terminal T200, the input terminal T201, the power supply line L201, the power distribution line L202, the output terminal T202, the input terminal T211, the power supply line L211, the power distribution line L212, the output terminal T212, the input terminal T221, the power supply line L221, . . . though a detailed description will be given later.

In the unit-side power source control units 251, the power supply lines (L201, L211, and L221) are connected to sources of MOSFETs (QF211, QF221, and QF231) as switches via resistances (R216, R226, and R236), and drains of the MOSFETs (QF211, QF221, and QF231) are connected to power distribution lines (L202, L212, and L222). The MOSFETs are a kind of field-effect transistors. In addition, current restriction circuits (262A, 262B, and 262C) including resistances (R216, R226, and R236) are provided between the power supply lines (L201, L211, and L221) and the MOSFETs (QF211, QF221, and QF231).

The current restriction units (262A, 262B, and 262C) include transistors (Q212, Q222, and Q232) which are PNP-type bipolar transistors with emitters connected to connection points (first connection points) between the input terminals (T201, T211, and T221) of the power supply lines (L201, L211, and L221) and the resistances (R216, R226, and R236) via resistances (R215, R225, and R235). The transistors (Q212, Q222, and Q232) have bases connected to connection points (second connection points) between the resistances (R216, R226, and R236) and the sources of the MOSFETs (QF211, QF221, and QF231) and collectors connected to the gates of the MOSFETs (QF211, QF221, and QF231). Resistances (R217, R227, and R237) are provided between the bases of the transistors (Q212, Q222, and Q232) and the second connection points, and resistances (R218, R228, and R238) are provided between the collectors of the transistors (Q212, Q222, and Q232) and the gates of the MOSFETs (QF211, QF221, and QF231). A function (current restriction function) of these current restriction units (262A, 262B, and 262C) will be described later.

In the unit-side power source control units 251, the power supply lines (L201, L211, and L221) are provided with switch drive delay units (260A, 260B, and 260C). In addition, one end of each electrolytic capacitor (C210, C220, or C230) is connected to each power supply line (L201, L211, or L221) between the connection point to the switch drive delay unit (260A, 260B, or 260C) and the motor drive unit 52, and the other end of each electrolytic capacitor (C210, C220, or C230) is connected to a ground terminal. The ground terminal is directly or indirectly grounded.

In the switch drive delay units (260A, 260B, and 260C), cathodes of Zener diodes (Z211, Z221, and Z231) are connected to the side of the power supply lines (L201, L211, and L221).

In contrast, between an anode of each Zener diode (Z211, Z221, or Z231) and each ground terminal, two resistances (R211 and R212, R221 and R222, or R231 and R232) are connected in series. Between the two resistances (between the resistance R211 and the resistance R212, between the resistance R221 and the resistance R222, or between the resistance R231 and the resistance R232), the base of each NPN-type bipolar transistor (Q211, Q221, or Q231) is connected. In addition, one end of each capacitor (C211, C221, or C231) is connected between the resistance (R211, R221, or R231) and the transistor (Q211, Q221, or Q231), and the other end of the capacitor (C211, C221, or C231) is connected to the ground terminal. The switch drive delay units (260A, 260B, and 260C) are configured to include an entirety or a part of these Zener diodes (Z211, 2221, and Z231), the resistances (R211, R221, and R231), the resistances (R212, R222, and R232) and the capacitors (C211, C221, and C231).

In the unit-side power source control units 251, switch drive units (261A, 261B, and 261C) are connected to the switch drive delay units (260A, 260B, and 260C). In the switch drive units (261A, 261B, and 261C), the transistors (Q211, Q221, and Q231) have collectors connected to the gates of the MOSFETs (QF211, QF221, and QF231) via resistances (R213, R223, and R233) and emitters connected to ground terminals. In addition, one end of each resistance (R214, R224, or R234) is connected to the side of the gate of each resistance (R213, R223, or R233), and the other end of the resistance (R214, R224, or R234) is connected to each power supply line (L201, L211, or L221). The switch drive units (261A, 261B, and 261C) are configured to include an entirety or a part of these transistors (Q211, Q221, and Q231), the resistances (R213, R223, and R233), and the resistances (R214, R224, and R234).

The switch drive delay unit 260A and the switch drive unit 261A provided in the unit-side power source control unit 251A in the sheet supply unit 50A are circuits configured to control driving timing of the switch (MOSFET QF211) provided in the unit-side power source control unit 251A, and correspond to the "switch control circuit" in the claims. Similarly, the switch drive delay unit 260B and the switch drive unit 261B provided in the unit-side power source control unit 251B in the sheet supply unit 50B are circuits (switch control circuit) configured to control drive timing of the switch (MOSFET QF221) provided in the unit-side power source control unit 251B. The switch drive delay unit 260C and the switch drive unit 261C provided in the unit-side power source control unit 251C in the sheet supply unit 50C are circuits (switch control circuit) configured to control driving timing of the switch (MOSFET QF231) provided in the unit-side power source control unit 251C.

According to the embodiment, the power distribution circuit 213 also includes the switch drive delay unit 215, the switch drive unit 216, the current restriction unit 217, and the switch (MOSFET QF201). These circuit configurations are the same as those of the switch drive delay units (260A, 260B, and 260C), the switch drive unit (261A, 261B, and 261C), the current restriction units (262A, 262B, and 262c), and the MOSFETs (QF211, QF221, and QF231) included in the unit-side power source control units (251A, 251B, and 251C).

That is, in the switch drive delay unit 215 in the power distribution circuit 213, a cathode of a Zener diode Z201 is connected to the side of the power distribution line L200. Between an anode of the Zener diode 2201 and a ground terminal, two resistances (R201 and R202) are connected in series. A base of a transistor Q201 as an NPN-type bipolar transistor is connected between the two resistances R201 and R202. In addition, one end of a capacitor C201 is connected between the resistance R201 and the base of the transistor Q201, and the other end of the capacitor C201 is connected to the ground terminal. The switch drive delay unit 215 is configured to include an entirety or a part of the Zener diode 2201, the resistance R201, the resistance R202, and the capacitor C201.

In the switch drive unit 216 in the power distribution circuit 213, a collector of the transistor Q201 is connected to the gate of the MOSFET QF201, and an emitter thereof is connected to a ground via a resistance R203. In addition, one end of a resistance R204 is connected to the side of the gate of the resistance R203, and the other end of the resistance R204 is connected to the power distribution line L200. The switch drive unit 216 is configured to include an entirety or a part of the transistor Q201, the resistance R203, and the resistance R204.

The current restriction unit 217 in the power distribution circuit 213 includes a transistor Q202 as a PNP-type bipolar transistor with an emitter connected to a connection point (third connection point) between the power distribution line L200 and a resistance R206 via a resistance R205. A base of the transistor Q202 is connected to a connection point (fourth connection point) between the resistance R206 and the source of the MOSFET QF201, and a collector thereof is connected to the gate of the MOSFET QF201. A resistance R207 is provided between the base of the transistor Q202 and the fourth connection point, and a resistance R208 is provided between the collector of the transistor Q202 and the gate of the MOSFET QF201.

Next, a description will be given of operations of the circuit shown in FIG. 10.

In a case in which output of the voltage to the power distribution line L200 of the power distribution circuit 213 is started as described above, and the voltage of the power distribution line L200 rises to a predetermined level in the power distribution circuit 213, breakdown of the Zener diode 2201 occurs, and a current flows from the cathode to the side of the anode. In doing so, a voltage corresponding to a ratio between the resistances R201 and R202 is generated between the base and the emitter of the transistor Q201, and the transistor Q201 is shifted from the non-conductive state (OFF) state to the conductive state (ON). The capacitor C201 stabilizes the operation of shifting the transistor Q201 to the ON state and delays the shifting timing.

If the transistor Q201 is brought into the ON state, a current flows to the transistor Q201 in a route from the power distribution line L200 through the resistances R204 and R203, a voltage corresponding to a ratio between the resistances R204 and R203 is applied between the gate and the source of the MOSFET QF201, and the MOSFET QF201 is shifted from the OFF state to the ON state. That is, after the output of the voltage to the power distribution line L200 is started, the MOSFET QF201 is driven (brought into the ON state) with some delay by the functions of the switch drive delay unit 215 and the switch drive unit 216. As a result, a current (inrush current IB1001) passes from the power distribution line L200 through the resistance R206 and between the source and the drain of the MOSFET QF201 and flows to the power distribution line L2001, and the inrush current IB1001 flows into the power supply line L201 of the unit-side power source control unit 251A of the sheet supply unit 50A in the highest level via the output terminal T200 and the input terminal T201. In addition, a voltage VB1001 is generated in the power supply line L201 due to the MOSFET QF201 conducting.

In the unit-side power source control unit 251A, electrical charge is accumulated in the electrolytic capacitor C210 due to the inrush current IB1001, and if the electrolytic capacitor C210 is fully charged, the inrush current IB1001 disappears.

Hereinafter, the voltage VB1001 is stably applied to the motor drive unit 52 to which the power supply line L201 is connected, and the motor drive unit 52 controls the motor 53 by using the applied voltage.

The voltage VB1001 is also applied to the side of the switch control circuit (the switch drive delay unit 260A and the switch drive unit 261A) in the unit-side power source control unit 251A from the power supply line L201. That is, if the voltage VB1001 rises to a predetermined level, breakdown of the Zener diode 2211 occurs. Thereafter, the same operations as those after the breakdown of the Zener diode 2201 in the power distribution circuit 213 occur in turn. That is, after the breakdown of the Zener diode Z211, a voltage in accordance with a ratio between the resistances R211 and R212 is generated between the base and the emitter of the transistor Q211, and the transistor Q211 is shifted from the OFF state to the ON state with some delay. In the same manner as the function of the capacitor C201, the capacitor C211 stabilizes the operation of shifting the transistor Q211 to the ON state and delays the shifting timing. If the transistor Q211 is brought into the ON state, a current flows to the transistor Q211 in a route from the power supply line L201 through the resistances R214 and R213, a voltage in accordance with a ratio between the resistances R214 and R213 is applied between the gate and the source of the MOSFET QF211, and the MOSFET QF211 is shifted from the OFF state to the ON state.

As a result, a current (inrush current IB1002) passes from the power supply line L201 through the resistance R216 and between the source and the drain of the MOSFET QF211 and flows to the power distribution line L202, and the inrush current IB1002 flows into the power supply line L211 of the unit-side power source control unit 251B of the sheet supply unit 50B in the lower level via the output terminal T202 and the input terminal T211. In addition, a voltage VB1002 is generated in the sheet supply line L211 due to the MOSFET QF211 conducting. In the unit-side power source control unit 251B, electrical charge is accumulated in the electrolytic capacitor C220 due to the inrush current IB1002, and if the electrolytic capacitor C220 is fully charged, the inrush current IB1002 disappears. Thereafter, the voltage VB1002 is stably applied to the motor drive unit 52 to which the power supply line L211 is connected.

The voltage VB1002 is also applied to the side of the switch control circuit (switch drive delay unit 260B and the switch drive unit 261B) in the unit-side power source control unit 251B from the power supply line L211. After breakdown of the Zener diode 2221, the transistor Q221 is shifted to the ON state with some delay, and thereafter, the MOSFET QF221 is shifted to the ON state. As a result, a current (inrush current IB1003) passes from the power supply line L211 through the resistance R226 and between the source and the drain of the MOSFET QF221 and flows to the power distribution line L212, and the inrush current IB1003 flows into the power supply line L221 of the unit-side power source control unit 251C of the sheet supply unit 50C in the lower level via the output terminal T212 and the input terminal T221. In addition, a voltage VB1003 is generated in the power supply line L221 due to the MOSFET QF221 conducting.

In the unit-side power source control unit 251C, electrical charge is accumulated in the electrolytic capacitor C230 due to the inrush current IB1003, and if the electrolytic capacitor C230 is fully charged, the inrush current IB1003 disappears. Thereafter, the voltage VB1003 is stably applied to the motor drive unit 52 to which the power supply line L221 is connected. The same operations occur in turn even if another unit-side power source control unit 251 is further connected to the lower level below the unit-side power source control unit 251C.

A description will be given of the current restriction function of the current restriction units (217, 262A, 262B, and 262C).

Although a description will be given of an example of the current restriction unit 262A herein, the other current restriction units 217, 262B, and 262C exhibit the same current restriction function. If the MOSFET QF211 conducts as described above, a voltage is generated in the resistance R216 due to the current flowing through the power supply line L201. In doing so, a voltage is generated between the base and the emitter of the transistor Q212, and the transistor Q212 is shifted to the ON state. If the transistor Q212 is brought into the ON state, a current flows in a route from the power supply line L201 through the resistance R215, the transistor Q212, and the resistance R218, and in accordance with an increase in the current, the amount of current flowing through the resistance R216 decreases. If the amount of the current flowing through the resistance R216 decreases, the transistor Q212 returns to the OFF state. Thereafter, the current passing through the resistance R216 and flowing into the MOSFET QF211 is restricted (equilibrated) to a specific level or lower by the transistor Q212 repeatedly being in the ON state and the OFF state.

According to the above description of FIG. 10, the input terminals (T201, T211, and T221) correspond to the power supply unit to which the main body portion 11 or the sheet supply unit 50 in the upper supplies electricity, and the output terminals (T202, T212, and T222) correspond to the power distribution unit which distributes electricity to the sheet supply unit 50 in the lower level. In addition, it is possible to state that the unit-side power source control units 251 (251A, 251B, and 251C) function as the control unit configured to cause the power distribution units (T202, T221, and T222) to start power distribution if voltages (VB1001, VB1002, and VB1003) of the supplied electricity exceed a predetermined threshold value after the power supply units (T201, T211, and T221) starts the power supply. In addition, the switch control circuits included in the unit-side power source control units 251 (251A, 251B, and 251C) shift the switches (MOSFET QF211, QF221, and QF231) from the non-conductive state to the conductive state in accordance with the voltages (VB1001, VB1002, and VB1003) of the electricity, which are supplied form the power supply units (T201, T211, and T221) to the side of the motors 53, exceeding a predetermined threshold value. In addition, the threshold value described herein indicates a level of the voltages (VB1001, VB1002, and VB1003) required to turning on the transistors (Q211, Q221, and Q231), for example.

Figure 11A:
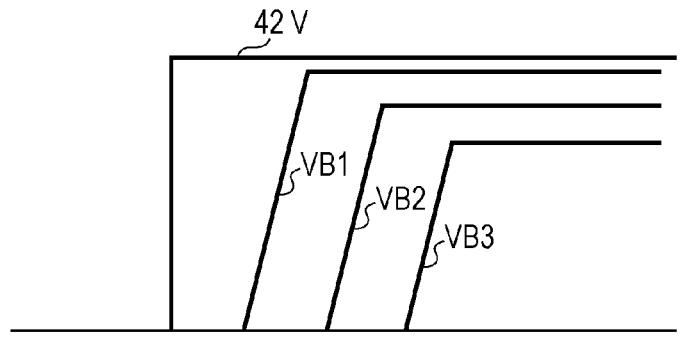
FIGS. 11A to 11E are diagrams showing, as an example, variations in voltage and current, with respect to time.
Figure 11B:
Figure 11C:
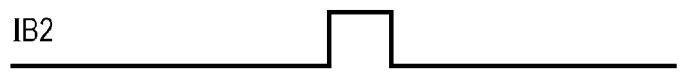
Figure 11D:
Figure 11E:

FIGS. 11A to 11E show an example of a result caused by the configuration shown in FIG. 10. FIG. 11A shows variations in voltage with respect to time, and shows a voltage (42 V, for example) which the power distribution circuit 213 outputs to the power distribution line L200 and voltages VB1001, VB1002, and VB1003 which are generated in the unit-side power source control units 251A, 251B, and 251C, respectively. In addition, FIGS. 11B, 11C, 11D, and 11E show variations in current with respect to time. FIG. 11B shows the inrush current IB1001 which flows when the MOSFET QF201 is turned on. FIG. 11C shows the inrush current IB1002 which flows when the MOSFET QF211 is turned on. FIG. 11D shows the inrush current IB1003 when the MOSFET QF221 is turned on. FIG. 11E shows variation in the current I42 which is made to flow to the power distribution line L200 by the power distribution circuit 213. Such an inrush current occurs in a case in which power supply to the main body portion 11 is started while the plurality of sheet supply units 50 are mounted on the main body portion 11 and a case in which the plurality of sheet supply units 50 are connected to the main body portion 11, to which the power supply has been started, at the same time (the sheet supply units 50 are connected in a state in which the power distribution circuit 213 performs power distribution from the power distribution line L200; this is also called live insertion), for example.

According to the embodiment, the inrush current (IB1002) which flows into a specific unit-side power source control unit 251 (the unit-side power source control unit 251B) is not generated until the switch (MOSFET QF211) is turned on by the voltage (VB1001), which is generated in the unit-side power source control unit 251 in the higher level (the unit-side power source control unit 251A), exceeding the predetermined value after the inrush current (IB1001) flows into the unit-side power source control unit 251 (the unit-side power source control unit 251A) in the higher level above the unit-side power source control unit 251. Therefore, the generation timing of the inrush current which flows into the sheet supply units 50 (the unit-side power source control units 251) deviates, as can be understood from the descriptions of FIG. 10 and FIGS. 11A to 11E.

Therefore, a peak value of the current I42 that the power distribution circuit 213 in the main body portion 11 makes to flow does not become a value which is as excessively large as a sum of the inrush current in the plurality of sheet supply units 50 and always becomes a value which is suppressed to be equal to or less than a specific value (equal to or less than the maximum value of the inrush current which flows into one unit-side power source control unit 251), and the burden on the main body portion 11 decreases.

According to the embodiment, all the sheet supply units 50 have the same configuration. Therefore, the effect as described above with reference to FIGS. 11A to 11E is achieved merely by mounting a number desired by the user of sheet supply units 50 with the same configuration on the main body portion 11. That is, it is possible to reliably cause the inrush current occurrence timing to deviate without requiring complicated design or operations such as an operation of differentiating setting of a time constant for each optional unit as disclosed in JP-A-2006-19986.

In the timing generation circuit disclosed in JP-A-2006-19986, a difference between an originally intended response speed and an actual response speed deviates for each timing generation circuit due to temporal degradation of the capacitors, variations in environmental temperature, and the like. For this reason, there is a need to provide a margin in order to be able to absorb the variations in the respective timing generation circuits (a difference in response speed between the timing generation circuits) in a stage of design in order to reliably secure the difference between the response speeds of the respective timing generation circuits, and as a result, it takes a long time to activate the plurality of optional units. However, since the switch in the optional unit in the lower level, which allows conduction, is controlled in accordance with an increase in voltage generated by the switch in the optional unit in the higher level allowing conduction in the embodiment, the timing of the switches allowing conduction reliably deviates between the optional units regardless of degradation of the capacitors and the like. Accordingly, an increase in time required for the plurality of optional units to be activated as in JP-A-2006-19986 does not occur.

According to the configuration of the current restriction units (262A, 262B, and 262C), resistances are provided on all the routes between the input terminals (T201, T211, and T221) and the switches (MOSFET QF211, QF221, and QF231) as can be understood from FIG. 10. A so-called parasitic capacitance is present in a switch element such as a MOSFET. In a case of live insertion of the sheet supply units 50 into the main body portion 11, in particular, a kind of inrush current called a spike wave or the like instantaneously flows into such a parasitic capacitance and may cause certain failures. Since the resistances are provided on all the routes between the input terminals (T201, T211, and T221) and the switches (MOSFETs QF211, QF221, and QF231) in the embodiment, it is possible to reliably restrict the inrush current flowing to the parasitic capacitance.

The invention is not limited to the embodiments and can be implemented in various configurations without departing from the gist thereof. Combinations of these configurations are also included in the scope of the invention. In other configurations described below, points which are different from those in the embodiment will be basically described.

Other Configurations

Figure 12:
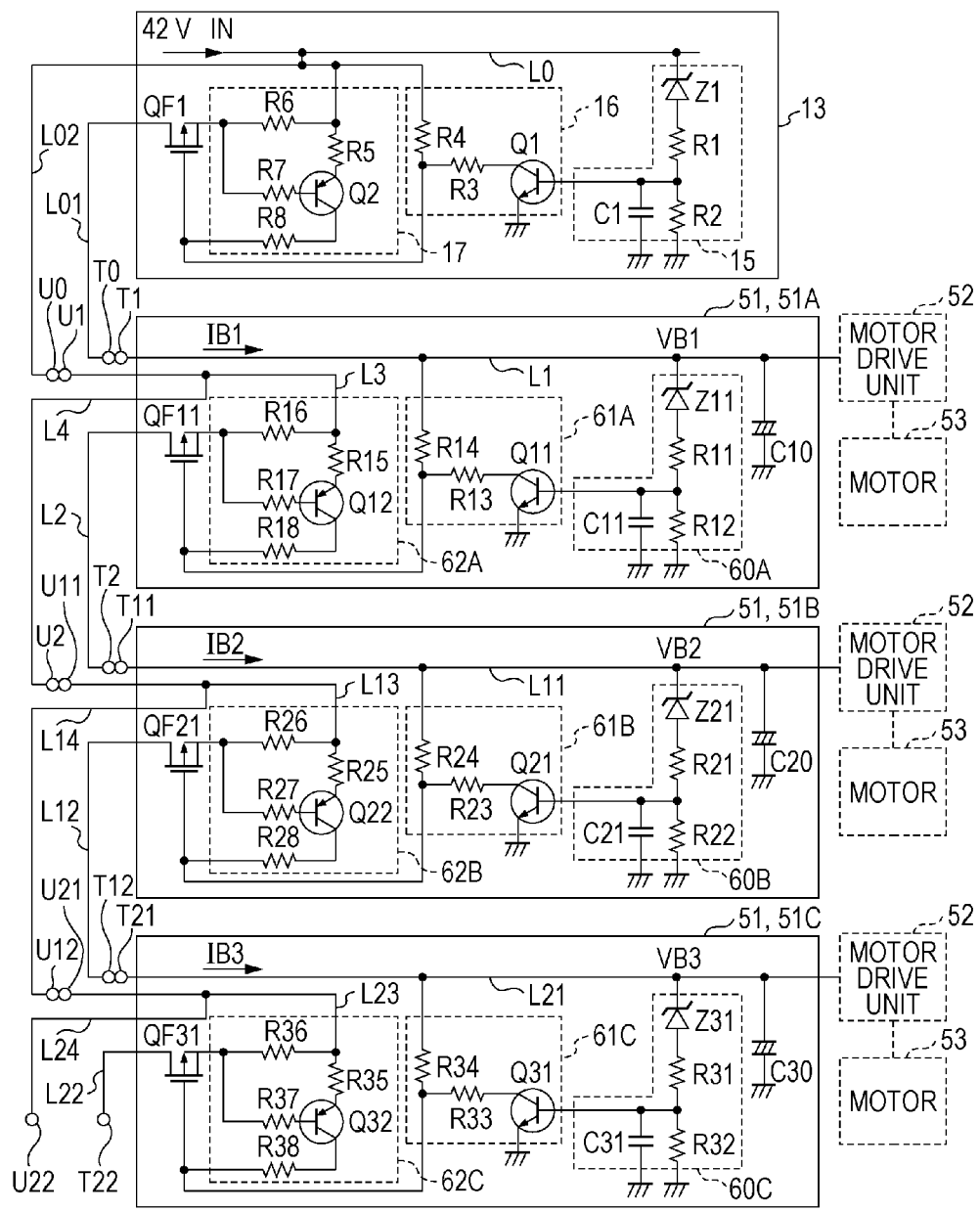
FIG. 12 is a circuit diagram showing, as an example, another configuration.

FIG. 12 shows an example of a connection state between the power distribution circuit 213 and the respective unit-side power source control units 251 according to another configuration. FIG. 12 is different from FIG. 10 (third embodiment) in the numbers and forms of the signal lines and the like connecting components. Specifically, a power distribution line L2002 which is directly connected to the power distribution line L200 extends from the power distribution circuit 213, and the power distribution line L2002 is provided with an output terminal U200. The unit-side power source control unit 251A of the sheet supply unit 50A in the highest level connected to the power distribution circuit 213 includes an input terminal U201 connected to the output terminal U200 and a signal line L203 connected to the input terminal U201. The signal line L203 branches such that one line is connected between the resistance R216 and the resistance R215 of the current restriction unit 262A and the other line functions as the power distribution line L204. No connection is established between the power supply line L201 and a point between the resistance R216 and the resistance R215 of the current restriction unit 262A.

Similarly, the power distribution line L204 which extends from the unit-side power source control unit 251A is provided with an output terminal U202. The unit-side power source control unit 251B of the sheet supply unit 50B connected to the unit-side power source control unit 251A of the sheet supply unit 50A includes an input terminal U211 connected to the output terminal U202 and a signal line L213 connected to the input terminal U211. The signal line L213 branches such that one line is connected between the resistance R226 and the resistance R225 of the current restriction unit 262B and the other line functions as a power distribution line L214. No connection is established between the power supply line L211 and a point between the resistance R226 and the resistance R225 of the current restriction unit 262B. Similarly, the power distribution line L214 which extends from the unit-side power source control unit 251B is provided with an output terminal U212. The unit-side power source control unit 251C of the sheet supply unit 50C connected to the unit-side power source control unit 251B of the sheet supply unit 50B includes an input terminal U221 connected to the output terminal U212 and a signal line L223 connected to the input terminal U221. The signal line L223 branches such that one line is connected between the resistance R236 and the resistance R235 of the current restriction unit 262C and the other line functions as a power distribution line L224. No connection is established between the power supply line L221 and a point between the resistance R236 and the resistance R235 of the current restriction unit 262C. Similarly, the power distribution line L224 which extends from the unit-side power source control unit 251C is provided with an output terminal U222.

Each of the input terminal U201 included in the unit-side power source control unit 251A of the sheet supply unit 50A, the input terminal U211 included in the unit-side power source control unit 251B of the sheet supply unit 50B, and the input terminal U221 included in the unit-side power source control unit 251C of the sheet supply unit 50C corresponds to the "common voltage receiving unit" to which a voltage (42V) common to the respective sheet supply units 50 is applied. In addition, it is possible to state that the MOSFETs (QF211, QF221, and QF231) are interposed between such common voltage receiving units (input terminals U201, U211, and U221) and the power distribution units (output terminals T202, T212, and T222).

According to the embodiment, the voltage VB1001 which is generated in the unit-side power source control unit 251A is lowered due to the resistance R206 of the power distribution circuit 213. In contrast, the voltage VB1002 which is generated in the unit-side power source control unit 251B is lowered due to the resistance R206 of the power distribution circuit 213 and the resistance R216 of the unit-side power source control unit 251A. The voltage VB1003 generated in the unit-side power source control unit 251C is lowered due to the resistance R206 of the power distribution circuit 213, the resistance R216 of the unit-side power source control unit 251A, and the resistance R226 of the unit-side power source control unit 251B (see FIG. 11A). According to another configuration described above, it is possible to improve the state in which decreases in voltage due to the resistances in the current restriction unit of the sheet supply units 50 in higher levels are accumulated in the sheet supply unit 50 in the lower level.

According to the configuration shown in FIG. 12, the effect described above with reference to FIGS. 3A to 3E can be achieved. Specifically, the voltage at the power distribution line L200 (42 V, for example) is applied as it is to the respective current restriction units (262A, 262B, and 262C) in the respective unit-side power source control units (251A, 251B, and 251C) through the route of the power distribution line L200, the power distribution line L2002, the output terminal U200, the input terminal U201, the signal line L203, the power distribution line L204, the output terminal U202, the input terminal U211, the signal line L213, the power distribution line L214, the output terminal U212, the input terminal U221, the signal line L223, . . . . Therefore, all the voltage VB202 generated in the unit-side power source control unit 251B, the voltage VB203 generated in the unit-side power source control unit 251C, . . . are equivalent to the voltage VB201 generated in the unit-side power source control unit 251A in the highest level (see FIG. 3A), and accumulation of the decreases in voltage as described above does not occur. According to the configuration shown in FIG. 12, each MOSFET (QF211, QF221, or QF231) is shifted to the ON state due to a difference between the voltage of the input terminal (U201, U211, or U221) and the voltage between the two resistances (between the resistances R214 and R213, between the resistances R224 and R223, or between the resistances R234 and R233) of the switch drive unit (261A, 261B, or 261C).

Returning to FIGS. 3A to 3E, FIGS. 3A to 3E show the result of another configuration described above in the same manner as in FIGS. 11A to 11E showing the result of the embodiment. According another configuration described above, the inrush current (IB202) which flows into a specific unit-side power source control unit 251 (the unit-side power source control unit 251B, for example) is not generated until the switch (QF211) is shifted to the ON state by the voltage (VB201), which is generated in the unit-side power source control unit 251 in the higher level (the unit-side power source control unit 251A), exceeding the predetermined value after the inrush current (IB201) flows into the unit-side power source control unit 251 (the unit-side power source control unit 251A) in a higher level above the unit-side power source control unit 251 in the same manner as in the embodiment. For this reason, the generation timing of the inrush current flowing into each sheet supply unit 50 (the unit-side power source control unit 251) deviates. Therefore, a peak value of the current I42 that the power distribution circuit 213 in the main body portion 11 makes to flow does not become a value which is as excessively large as a sum of the inrush current in the plurality of sheet supply units 50 and always becomes a value which is suppressed to be equal to or less than a specific value (equal to or less than the maximum value of the inrush current which flows into one unit-side power source control unit 251), and the burden on the main body portion 11 decreases.

Another configuration described above is different from the embodiment in that an effect in that accumulation of decreases in voltage of the sheet supply unit 50 in the lower level as described above is achieved. However, the embodiment can achieve a decrease in size and a decrease in cost of the product as compared with another configuration described above. That is, since the numbers of signal lines and terminals connecting the power distribution circuit 213 and the sheet supply unit 50 in the highest level (the unit-side power source control unit 251A) and the numbers of signal lines and terminals connecting between the sheet supply units 50 (between the unit-side power source control unit 251A and the unit-side power source control unit 251B, between the unit-side power source control unit 251B and the unit-side power source control unit 251C, . . . ) are smaller in the embodiment than those in the configuration shown in FIG. 12, it is possible to contribute to a decrease in size and a decrease in cost of the circuit configuration for adding the sheet supply units 50 to the main body portion 11. It is a matter of course that all the sheet supply units 50 have the same configuration even in another configuration described above, the effect described above with reference to FIGS. 3A to 3E can be achieved merely by the user mounting a desired number of sheet supply units 50 with the same configuration on the main body portion 11.

Modification Examples

The invention is not limited to the aforementioned embodiments, and can be implemented in various configurations without departing from the gist of the invention.

In the aforementioned embodiments, the "connection" between components shown in FIGS. 10 and 12 represents only electrical connection between the components. Therefore, other configurations which are not shown in the drawings may be interposed between the components, or physical connection (wired connection) may be cut, as long as the electrical connection between the components is available.

In a case of assuming the optional units to be the sheet supply units 50 as described above, it is possible to apply the invention to any product as long as the sheet supply units 50 can be additionally mounted thereon. That is, the invention can be applied to any product such as a printer, which requires supply of sheets, instead of a facsimile apparatus or a multifunction machine.

In addition, the main body portion 11 can be referred to as a power supply apparatus in terms of the function of supplying electricity for driving the respective optional units. The system including such a power supply apparatus and such optional units may be implemented as an independent product such as a facsimile apparatus, a multifunction machine, or a printer, or may be constructed across a plurality of products or apparatuses.

In addition, the optional units are not limited to the sheet supply units. That is, the relationship between the sheet supply apparatus and the optional units, which is proposed by the invention, is widely applied to relationships between a side (master) of controlling a system which is constructed in a specific scene for performing power supply and communication and a side (slave) of being connected to and controlled by the system. For example, a plurality of batteries (cells) to be mounted on an electrical vehicle is assumed. An in-vehicle controller configured to control operations of the batteries corresponds to the power supply apparatus proposed by the invention, and the respective batteries controlled by the controller correspond to the optional units proposed by the invention. Alternatively, a PC and additional devices that a user arbitrarily adds to the PC are assumed. The PC corresponds to the power supply apparatus proposed by the invention, and the additional devices correspond to the optional units proposed by the invention.

From such a wide viewpoint of not limiting the invention to a product on which sheet supply units are mounted, it is possible to state that the embodiment discloses a configuration of an optional unit configured to be connected to a power supply apparatus, the operation unit including: a power supply unit configured to receive electricity supplied from the power supply apparatus or an optional unit in a higher level; a power distribution unit configured to distribute electricity to an optional unit in a lower level; an operation unit configured to operate with the electricity supplied from the power supply unit; and a control unit configured to cause the power distribution unit to start the power distribution in accordance with a voltage of the supplied electricity exceeding a predetermined threshold value after the power supply unit starts the power supply.

Furthermore, it is possible to state that the embodiment discloses a configuration of a control system of optional units, which is provided with a power supply apparatus and optional units connected to the power supply apparatus, the power supply apparatus including a first power distribution unit (output terminal T200) configured to distribute electricity to an optional unit in the highest connection level, each of the optional units including a power supply unit (input terminal T201, T211, or T221), a second power distribution unit (output terminal T202, T212, or T222) configured to distribute the electricity to an optional unit in the lower level, an operation unit configured to operate with the electricity supplied from the power supply unit, and a control unit configured to cause the second power distribution unit to start the power distribution in accordance with a voltage of the supplied electricity exceeding a predetermined threshold value after the power supply unit starts the power supply.

In addition, a part or an entirety of wiring between the power supply apparatus and the optional units or between the optional units may be replaced with wireless connection. Although the type of the wireless connection is arbitrarily selected, the supply of the voltage may be replaced with wireless power supply based on an electromagnetic induction scheme, or the notification signal may be sent in the wireless manner by using light with light intensity in accordance with a voltage.

The entire disclosure of Japanese Patent Application No. 2014-023833, filed Feb. 10, 2014, Application No. 2014-069759, filed Mar. 28, 2014 and Application No. 2014-069760, filed Mar. 28, 2014 are expressly incorporated by reference herein.

What is claimed is:

1. An optional unit configured to be connected, in series, to a power supply apparatus for supplying drive electricity, the optional unit comprising:
   a receiving unit which receives the electricity supplied from the power supply apparatus or an optional unit in a higher connection level;
   a supply unit which supplies the electricity to a receiving unit of an optional unit in a lower connection level;
   an operation unit which operates based on the electricity received by the receiving unit;
   a notification input unit which inputs a notification signal from the power supply apparatus or the optional unit in the higher level;
   a notification output unit which outputs the electricity, which is supplied from the receiving unit to the operation unit, as the notification signal to the notification input unit in the optional unit in the lower level; and
   a control unit which starts the supply of the electricity from the receiving unit to the operation unit in accordance with the voltage of the notification signal, which is input by the notification input unit, exceeding a predetermined threshold value.

2. The optional unit according to claim 1, wherein the control unit includes a switch which is interposed between the receiving unit and a motor and a switch control circuit which shifts the switch from a non-conductive state to a conductive state in accordance with the voltage of the notification signal, which is input by the notification input unit, exceeding the threshold value.

3. The optional unit according to claim 2,
   wherein the control unit includes a capacitor which has one end connected between the switch and the operation unit and the other end connected to a ground,
   wherein the switch is a MOSFET,
   wherein the switch control circuit includes a Zener diode with a cathode connected to the side of the notification input unit and a first bipolar transistor with a base connected to the side of an anode of the Zener diode, a collector connected to a gate of the MOSFET, and an emitter connected to a ground, and
   wherein breakdown of the Zener diode occurs in accordance with an increase in voltage of the notification signal which is input by the notification input unit, the first bipolar transistor is shifted from the non-conductive state to the conductive state after the breakdown, and electrical charge is accumulated in the capacitor by a current which passes between a source and a drain of the MOSFET from the receiving unit and is input to the side of the operation unit in accordance with the MOSFET being shifted from the non-conductive state to the conductive state after the first bipolar transistor conducts.

4. The optional unit according to claim 2,
   wherein in the control unit, resistors are provided on all routes between the receiving unit and the switch.

5. The optional unit according to claim 4,
   wherein in the control unit,
   the switch is a MOSFET,
   a first resistor is provided between the receiving unit and the source of the MOSFET,
   a second bipolar transistor with an emitter connected to a first connection point between the receiving unit and the first resistor, a base connected to a second connection point between the first resistor and the source of the MOSFET, and a collector connected to the gate of the MOSFET is provided, and
   a second resistor is provided between the base of the second bipolar transistor and the second connection point, and a third resistor is provided between the collector of the second bipolar transistor and the gate of the MOSFET.

6. An optional unit configured to be connected, in series, to a power supply apparatus for supplying drive electricity, the optional unit comprising:
   a receiving unit which receives the electricity supplied from the power supply apparatus or an optional unit in a higher connection level;
   a supply unit which supplies the electricity to a receiving unit of an optional unit in a lower connection level;
   an operation unit which operates based on the electricity received by the receiving unit:
   a notification unit which provides notification of power supply permission to the receiving unit of the optional unit in the lower level;
   a permission receiving unit which receives the power supply permission from the power supply apparatus or the notification unit of the optional unit in the higher level; and a control unit which causes a power supply unit to start power supply in accordance with the reception of the power supply permission by the permission receiving unit, and causes the notification unit to provide the notification of the power supply permission if a voltage of the supplied power exceeds a predetermined threshold value.

7. The optional unit according to claim 6,
wherein the control unit includes a switch interposed between the power supply unit and a motor, causes the switch to allow conduction in accordance with the reception of the power supply permission by the receiving unit, and causes the notification unit to provide the notification of the power supply permission in accordance with the voltage of the power, which is supplied to the side of the motor due to the switch allowing the conduction, exceeding the threshold value.

8. The optional unit according to claim 6,
wherein the control unit includes a capacitor with one end connected between the switch and a motor and the other end connected to a ground terminal, a Zener diode with a cathode connected between the switch and the end of the capacitor, and a bipolar transistor with a base connected to a side of an anode of the Zener diode, a collector connected to the notification unit, and an emitter connected to a ground terminal,
wherein the switch is a MOSFET,
wherein the receiving unit is connected to a gate of the MOSFET, and
wherein electrical charge is accumulated in the capacitor by a current which passes between a source and a drain of the MOSFET from the power supply unit and is input to a side of the motor by the MOSFET being shifted from the non-conductive state to the conductive state in accordance with a difference between a voltage at the electricity supply unit and a voltage of the power supply permission received by the receiving unit, and the signal as the power supply permission is generated on a side of the collector in response to breakdown of the Zener diode caused by an increase in voltage of the power supplied to a side of the motor and shifting of the bipolar transistor from the non- conductive state to the conductive state after the breakdown.

9. The optional unit according to claim 8,
wherein in the control unit, resistors are provided on all routes between the power supply unit and the switch.

10. The optional unit according to claim 1,
wherein the control unit causes a power distribution unit to start power distribution if the voltage of the supplied electricity exceeds the predetermined threshold value after the power supply unit starts the power supply.

11. An optional unit configured to be connected, in series, to a power supply apparatus for supplying drive electricity, the optional unit comprising:
a receiving unit which receives the electricity supplied from the power supply apparatus or an optional unit in a higher connection level;
a supply unit which supplies the electricity to a receiving unit of an optional unit in a lower connection level;
an operation unit which operates based on the electricity received by the receiving unit; and
a control unit which includes a switch which is interposed between the power supply unit and the power distribution unit and a switch control circuit which shifts the switch from the non-conductive state to the conductive state in accordance with the voltage of the electricity, which is supplied from the power supply unit to the side of a motor, exceeding a threshold value.

12. The optional unit according to claim 11,
wherein the control unit includes a capacitor with one end connected between the power supply unit and the motor and the other end connected to a ground terminal,
wherein the switch is a MOSFET,
wherein the switch control unit includes a Zener diode with a cathode connected to a side of the power supply unit and a bipolar transistor with a base connected to a side of an anode of the Zener diode, a collector connected to a gate of the MOSFET, and an emitter connected to a ground terminal, and
wherein breakdown of the Zener diode occurs in accordance with an increase in voltage of the electricity supplied from the power supply unit to the side of the motor, the bipolar transistor is shifted from the non-conductive state to the conductive state after the breakdown, and the MOSFET is shifted from the non-conductive state to the conductive state by the bipolar transistor conducting.

13. The optional unit according to claim 11,
wherein in the control unit, resistors are provided on all routes between the power supply unit and the switch.

14. The optional unit according to claim 10,
wherein each of sheet supply units is provided with a common voltage receiving unit to which a voltage common to the respective sheet supply units is applied, and
wherein the control unit is provided with a switch interposed between the common voltage receiving unit and the power distribution unit and a switch control unit which shifts the switch from the non-conductive state to the conductive state in accordance with the voltage of the electricity, which is supplied from the power supply unit to the side of a motor, exceeding the threshold value.

* * * * *